US012381346B2

(12) United States Patent
Inukai et al.

(10) Patent No.: US 12,381,346 B2
(45) Date of Patent: Aug. 5, 2025

(54) CONNECTOR WITH STABLE AND RELIABLE ATTACHMENT TO A WALL MEMBER OPENING

(71) Applicant: Molex, LLC, Lisle, IL (US)

(72) Inventors: Hitomi Inukai, Yamato (JP); Tetsunori Tsumuraya, Yamato (JP); Hisashi Miyamoto, Yamato (JP)

(73) Assignee: Molex, LLC, Lisle, IL (US)

( * ) Notice: Subject to any disclaimer, the term of this patent is extended or adjusted under 35 U.S.C. 154(b) by 320 days.

(21) Appl. No.: 18/143,093

(22) Filed: May 4, 2023

(65) Prior Publication Data

US 2023/0369794 A1 Nov. 16, 2023

(30) Foreign Application Priority Data

May 12, 2022 (JP) ................................ 2022-078909
Sep. 13, 2022 (JP) ................................ 2022-145040

(51) Int. Cl.

*H01R 12/77* (2011.01)
*H01R 12/78* (2011.01)
*H01R 13/627* (2006.01)
*H01R 13/74* (2006.01)
*H01R 24/76* (2011.01)

(52) U.S. Cl.

CPC ........... *H01R 12/771* (2013.01); *H01R 12/78* (2013.01); *H01R 13/6271* (2013.01); *H01R 13/6275* (2013.01); *H01R 13/745* (2013.01); *H01R 24/76* (2013.01)

(58) Field of Classification Search

CPC .. H01R 12/771; H01R 12/78; H01R 13/6271; H01R 13/6275; H01R 13/745; H01R 24/76; H01R 13/5025; H01R 13/743; H01R 13/506; H01R 13/426; H01R 13/428; H01R 13/514

See application file for complete search history.

(56) References Cited

U.S. PATENT DOCUMENTS 3,560,908 A * 2/1971 Dell et al. ............ H01R 13/743 439/353
6,095,855 A 8/2000 Iwata et al.
7,384,303 B2 * 6/2008 Murakami ........... H01R 13/743 439/557

(Continued)

FOREIGN PATENT DOCUMENTS

DE 69834079 T2 * 8/2006 ........... H01R 13/506
EP 1324431 A2 7/2003

(Continued)

*Primary Examiner* — Travis S Chambers

(57) ABSTRACT

A connector, comprising:
- a housing;
- a plurality of elastic members combined with the housing; and
- a plurality of terminals mounted in the housing, wherein
- the housing can be inserted into an opening formed in a wall member,
- the elastic members include a mating exposed surface exposed on a mating surface of the housing and a side wall exposed surface exposed on a side wall surface of the housing and constitute at least one left and right symmetric pair positioned respectively on both left and right sides in the width direction of the housing, and
- the side wall exposed surface includes a rib extending in the mating direction that is able to come into contact with an inner surface of the opening.

10 Claims, 39 Drawing Sheets

(56) References Cited

U.S. PATENT DOCUMENTS

| | | | | |
|---|---|---|---|---|
| 7,695,304 | B2 * | 4/2010 | Chiang | H01R 13/6582 439/353 |
| 7,828,582 | B2 * | 11/2010 | Xu | H01R 12/712 439/353 |
| 9,413,115 | B1 | 8/2016 | Henry | |
| 11,682,853 | B2 * | 6/2023 | Henry | H01R 12/721 439/634 |
| 2016/0118742 | A1 | 4/2016 | Akagi et al. | |

FOREIGN PATENT DOCUMENTS

| | | | |
|---|---|---|---|
| EP | 3716413 | A1 | 9/2020 |
| JP | 2005063971 | A | 3/2005 |
| JP | 2008071524 | A | 3/2008 |
| JP | 4278556 | B2 | 6/2009 |
| JP | 6572418 | B2 * | 9/2019 |

* cited by examiner

CONNECTOR WITH STABLE AND RELIABLE ATTACHMENT TO A WALL MEMBER OPENING

RELATED APPLICATIONS

This application claims priority to Japanese Patent Application No. 2022-078909, filed on May 12, 2022, and Japanese Patent Application No. 2022-145040, filed on Sep. 13, 2022, both which of which are incorporated herein by reference in their entireties.

TECHNICAL FIELD

The present disclosure relates to a connector.

BACKGROUND ART

Conventionally, in various electrical devices and electronic devices, in order to electrically connect the inside and the outside of a case such as a casing or a housing, a connector penetrating through an opening of the case is used. This type of connector is attached to the case by a member such as an elastically deformable retainer to prevent detachment from the case.

FIG. 39 is an exploded perspective view of a connector that penetrates through an opening of a conventional case.

In the figure, 810 is a receptacle connector as a connector, to which a shield cover 871 is attached. In addition, a gasket 831 is fitted to the receptacle connector 810 from the front surface thereof. Thereafter, the receptacle connector 810 is inserted into the opening 892 formed in a wall surface 891 of the case from the rear surface side of the wall surface 891, and a retainer clip 872 is inserted into the opening 892 from the front surface side of the wall surface 891. Furthermore, a plug connector (not shown) as a counterpart connector is inserted into the retainer clip 872 and mated with the receptacle connector 810.

Prior Art Documents: Patent Documents: Patent Document 1: Japanese Unexamined Patent Application 2005-063971

SUMMARY

However, in the conventional connector, dimensional accuracy of the opening 892 formed in the wall surface 891 of the case is relatively low (dimensional tolerance is relatively high) causing occurrence of a gap between the inner surface of the opening 892 and the outer surface of the connector, and thus the connector cannot be stably attached to the wall surface 891 generating looseness in the connector. Furthermore, if there is looseness, there is a possibility of the outer surface of the connector being scratched by the edge of the opening 892 in the wall surface 891.

Here, in order to resolve the conventional problems, an object is to provide a connector that enables attaching to a wall member without looseness, stably and reliably maintaining the attached state, and size reduction, with a simple structure, reduced component count, simplified manufacturing, reduced cost, and high reliability.

Therefore, the connector includes:

a housing;

a plurality of elastic members combined with the housing; and a plurality of terminals mounted in the housing, wherein the housing can be inserted into an opening formed in a wall member, the elastic members include a mating exposed surface exposed on a mating surface of the housing and a side wall exposed surface exposed on a side wall surface of the housing and constitute at least one left and right symmetric pair positioned respectively on both left and right sides in the width direction of the housing, and the side wall exposed surface includes a rib extending in the mating direction that is able to come into contact with an inner surface of the opening.

In another connector:

the side wall surfaces of the housing include a first side wall surface, a second side wall surface, a third side wall surface, and a fourth side wall surface, the elastic member positioned on a first of the left or right side of the housing in the width direction includes a first side wall exposed surface, a second side wall exposed surface, and a third side wall exposed surface exposed on the first side wall surface, the second side wall surface, and the third side wall surface of the housing and each of the first side wall exposed surface, the second side wall exposed surface, and the third side wall exposed surface include the ribs, and the elastic member positioned on a second of the left or right side of the housing in the width direction includes a first side wall exposed surface, a second side wall exposed surface, and a fourth side wall exposed surface exposed on the first side wall surface, the second side wall surface, and the fourth side wall surface of the housing and each of the first side wall exposed surface, the second side wall exposed surface, and the fourth side wall exposed surface include ribs.

In yet another connector, there are at least six ribs, and the ribs respectively include at least a tip that protrudes outside of the side wall surface of the housing.

In yet another connector, there are two pair of the elastic members.

In yet another connector, the housing includes a locking part positioned toward the center thereof in the width direction and each of the elastic members are combined with the housing more to the outside in the width direction of the housing than the locking part.

In yet another connector, the locking part includes a locking member and a protruding part that can engage with the wall member.

In yet another connector, the mating surfaces are positioned on both sides of the housing in the mating direction.

In yet another connector, the housing includes a contour protruding part formed along a contour of the mating exposed surface and the side wall exposed surface of the elastic members.

In yet another connector, the housing includes a locking part that can lock with a counterpart connector that can mate with the connector.

In yet another connector, the connector is a relay connector or a board connector mounted on a board for mating with a pair of counterpart connectors and connecting the pair of counterpart connectors together.

According to the present disclosure, the connector enables attaching to the wall member without looseness and reliably and stably maintaining the attached state. In addition, the size of the connector can be reduced. Furthermore, the structure is simplified, component count is reduced, manufacturing is simplified, costs are reduced, and reliability is increased.

BRIEF DESCRIPTION OF THE DRAWINGS

FIG. 11A is a top view and FIG. 11B is a cross section view taken along the line A-A in FIG. 11A;

FIG. 15A is a side view of a preferred example, and FIG. 15B is a side view of a modified example;

FIG. 16A is a cross section view taken along the line B-B in FIG. 11B and FIG. 16B is a cross section view taken along the line C-C in FIG. 11B;

FIG. 23A is a diagram illustrating a state with a bottom cover member attached, and FIG. 23B is a diagram illustrating a state with the bottom cover member removed;

FIG. 27A is a diagram illustrating a state with a bottom cover member attached, and FIG. 27B is a diagram illustrating a state with the bottom cover member removed;

FIG. 30A is a top view and FIG. 30B is a cross section view taken along the line D-D in FIG. 30A;

FIG. 36A is a side view of a preferred example, and FIG. 36B is a side view of a modified example;

FIG. 37A is a cross section view taken along the line E-E in FIG. 30B and FIG. 37B is a cross section view taken along the line F-F in FIG. 30B;

DETAILED DESCRIPTION OF THE PREFERRED EMBODIMENTS

Embodiments will hereinafter be described in detail with reference to the drawings.

Figure 1:
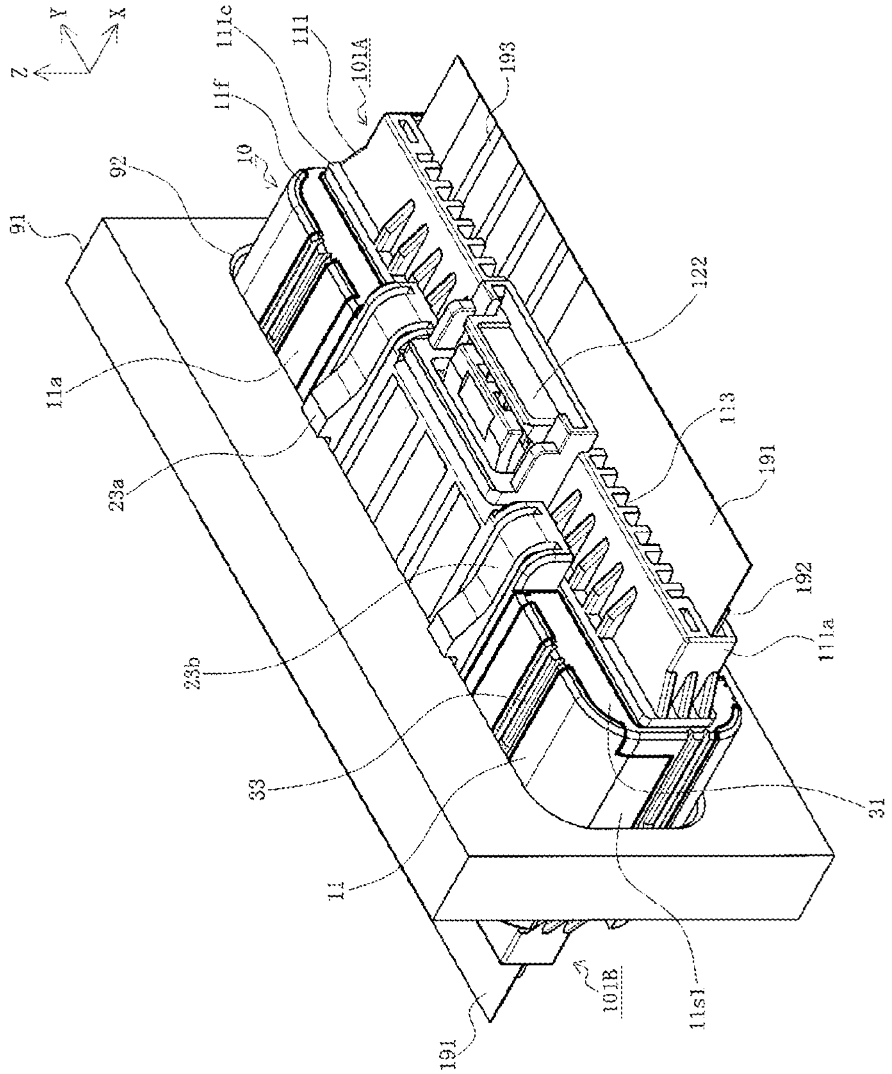
FIG. 1 is a first perspective view illustrating a state in which first and second counterpart connectors are mated to a connector attached to a wall member according to Embodiment 1.
Figure 2:
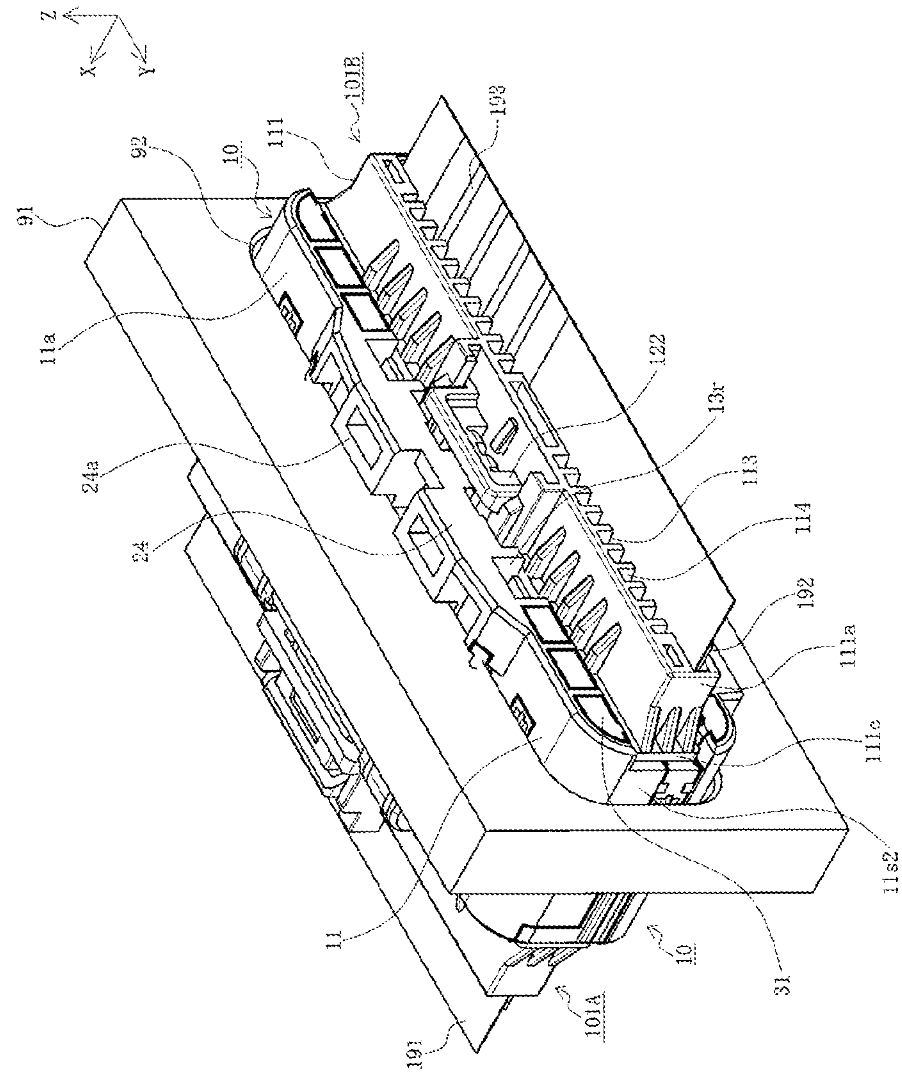
FIG. 2 is a second perspective view illustrating a state in which first and second counterpart connectors are mated to a connector attached to a wall member according to Embodiment 1.
Figure 3:
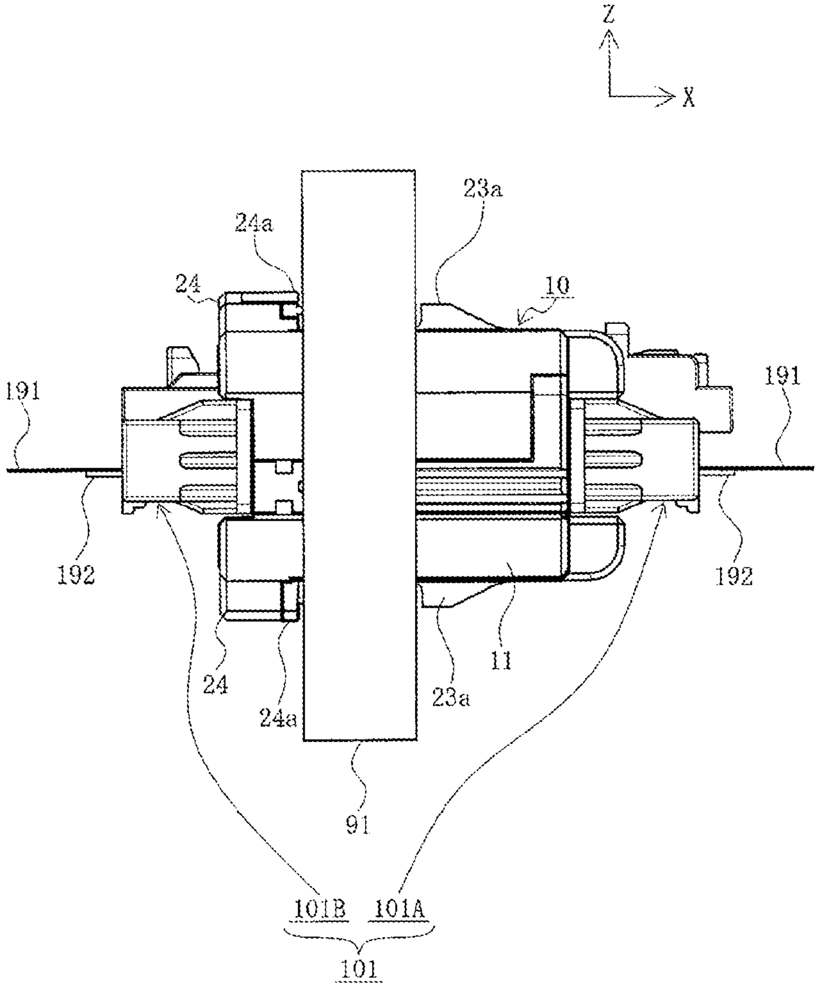
FIG. 3 is a side view illustrating a state in which first and second counterpart connectors are mated to a connector attached to a wall member according to Embodiment 1.
Figure 4:
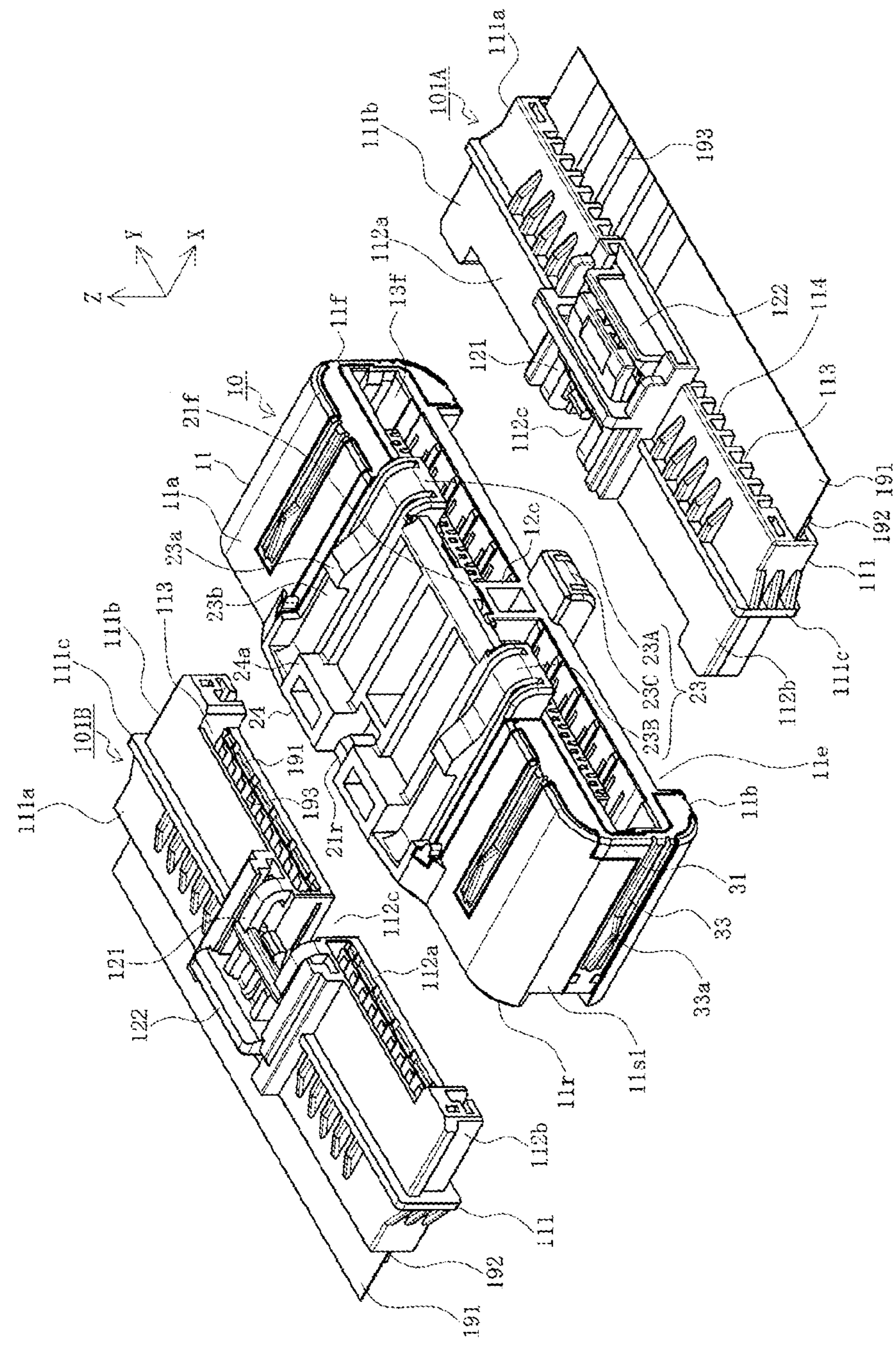
FIG. 4 is a perspective view illustrating a state before mating between the connector and the first and second counterpart connectors according to Embodiment 1.

FIG. 1 is a first perspective view illustrating a state in which first and second counterpart connectors are mated to a connector attached to a wall member according to Embodiment 1. FIG. 2 is a second perspective view illustrating a state in which first and second counterpart connectors are mated to a connector attached to a wall member according to Embodiment 1. FIG. 3 is a side view illustrating a state in which first and second counterpart connectors are mated to a connector attached to a wall member according to Embodiment 1. FIG. 4 is a perspective view illustrating a state before mating between the connector and the first and second counterpart connectors according to Embodiment 1.

In the figures, 10 represents a connector according to the present Embodiment, which is attached to a wall member 91. The wall member 91 is, for example, an outer wall of a case such as a casing or housing of various electrical devices or electronic devices, but may be of any type as long as it is a wall-shaped or a plate-shaped member, and may be used for any purpose. The wall member 91 is formed with an insertion opening 92 that is an opening penetrating the wall member 91. As illustrated in FIGS. 1 to 3, the connector 10 is attached to the wall member 91 in a state of being inserted into the insertion opening 92. Note that in FIGS. 1 to 3, for convenience of illustration, the illustration of the wall member 91 other than the peripheral portion around the insertion opening 92 is omitted.

In addition, the connector 10 may be any type and may be used for any purpose. For example, the connector may be a board connector mounted on a board such as a circuit board, or a cable connector connected to a flexible flat cable or a ribbon cable; however, as illustrated in FIGS. 1 to 4, a relay connector where both mating ends respectively connect to a counterpart connector 101 will be used for description. A first counterpart connector 101A is mated to a first mating end of the connector 10, in other words, to the front (X-axis positive direction) mating end, and a second counterpart connector 101B is mated to a second mating end of the connector 10, in other words, to the rear (X-axis negative direction) mating end.

In the present embodiment, the first counterpart connector 101A and the second counterpart connector 101B are so-called FPC connectors used as jackets and having a FPC 191 attached thereto for electrically connecting the FPC 191 that is a flexible circuit board to the connector 10. The first counterpart connector 101A and second counterpart connector 101B are described as the counterpart connector 101 when collectively described. In addition, with the present embodiment, FPC 191 means not only a flexible circuit board but also flexible flat boards to flexible flat cables including a flexible flat cable called an FFC and may be any type of flexible flat board to flexible flat cable.

Note that in Embodiment 1, expressions indicating directions such as top, bottom, left, right, front, rear, and the like used to describe a configuration and operation of each unit of the connector 10, the counterpart connector 101, the FPC 191, and the like are relative rather than absolute, and are proper when each unit of the connector 10, the counterpart connector 101, the FPC 191, and the like are in positions illustrated in the drawings, but should be changed and interpreted according to a change in position when the orientation changes.

Furthermore, the connector 10 includes a housing 11 as a connector main body integrally formed using an insulating material like a synthetic resin such as polybutylene terephthalate (PBT) containing roughly 15% glass fiber and a plurality of electrically conducting terminals 61, described below, mounted in the housing 11.

As shown in the figure, the housing 11 has an outer shape elongated in the width direction (Y-axis direction), and has a substantially rectangular upper surface 11*a* in a plan view (as seen from the Z-axis direction), a lower surface 11*b* opposite the upper surface 11*a*, a right side surface 11*s*1 and a left side surface 11*s*2 connected to both ends of the upper surface 11*a* and lower surface 11*b* in the width direction and substantially orthogonal to the upper surface 11*a* and lower surface 11*b*, and a front surface 11*f* and rear surface 11*r* at the front end and rear end that are orthogonal to the upper surface 11*a*, and the lower surface 11*b* as well as the right side surface 11*s*1 and the left side surface 11*s*2. Note that the right side surface 11*s*1 and the left side surface 11*s*2 may be collectively described as side surface 11*s*. In addition, the front surface 11*f* and the rear surface 11*r* are surfaces that face the counterpart connector 101 that mates with the connector 10 and are also called mating surfaces. Furthermore, the upper surface 11*a*, the lower surface 11*b*, the right side surface 11*s*1 and the left side surface 11*s*2 are surfaces constituting side walls of the housing 11, and are respectively a first side wall surface, a second side wall surface, a third side wall surface, and a fourth side wall surface. Also referred to collectively as side wall surfaces.

Note that the connecting portion between the upper surface 11*a* and the side surface 11*s* and the connecting portion between the lower surface 11*b* and the side surface 11*s* is a curved surface curved in a fan shaped curvature with a central angle of roughly 90 degrees, as viewed from the front-to-back direction (X-axis direction). Furthermore, with the connector 10 inserted into the insertion opening 92, the a gap is unavoidably generated in the space between the upper surface 11*a*, lower surface 11*b*, and/or side surface 11*s* as the outer surface of the housing 11 and the inner surface of the insertion opening 92 due to dimensional tolerance.

In addition, a forward insertion recessed part 13*f* opened on the front surface 11*f* and a rearward insertion recessed part 13*r* opened on the rear surface 11*r* are formed in the housing 11. The first counterpart connector 101A is inserted into the forward insertion recessed part 13*f* and the second counterpart connector 101B is inserted into the rearward insertion recessed part 13*r*. Note that the forward insertion recessed part 13*f* and the rearward insertion recessed part 13*r* may collectively be described as insertion recessed part 13. This insertion recessed part 13 is divided into two by a mating column part 12*c* positioned nearly in the center in the width direction (Y-axis direction) thereof. In addition, a front locked part 21*f* that engages and locks with a counterpart lock member 121 of the first counterpart connector 101A is formed near the center of the front surface 11*f* in the width direction. Also, a rear locked part 21*r* that engages and locks with a counterpart lock member 121 of the second counterpart connector 101B is formed near the center of the rear surface 11*r* in the width direction. In other words, the housing 11 includes the front locked part 21*f* and the rear locked part 21*r* as locking parts with the counterpart connector 101.

Furthermore, the housing 11 has a locking member 23 and a protruding part 24 positioned toward the center in the width direction (Y-axis direction) that can engage with the wall member 91 and constitute the locking part for locking with the wall member 91. Specifically, the locking members 23 are formed on the upper surface 11*a* and lower surface 11*b* and the protruding parts 24 protruding upward and downward are formed at the rear end of the upper surface 11*a* and the lower surface 11*b*. In addition, a lower recessed part 11*e* recessed upward (Z-axis positive direction) is formed in the lower surface 11*b*. The front end of this lower recessed part 11*e* is open and the rear end is demarcated by the protruding part 24 that is protruding downward, and the lower recessed part is divided into left and right by the locking member 23 positioned near the center of the lower surface 11*b* in the width direction (Y-axis direction).

The number installed and installation positions of the locking member 23 can be changed as appropriate, but in the example illustrated in the figures, two locking members, first locking member 23A and second locking member 23B are installed on the upper surface 11*a*, and a third locking member 23C is installed on lower surface 11*b*. Note that in the example illustrated in the figures, the locking member 23 is formed such that the front end thereof protrudes more forward than the front end of the upper surface 11*a* and the lower surface 11*b*. Furthermore, each of the locking members 23 include a long and narrow locking arm part 23*b* extending in the front-to-back direction and a locking protruding part 23*a* in the center of the locking arm part 23*b*, protruding outward (upward and downward). The locking arm part 23*b* is a double supported beam elastically deformable member secured on both front and rear ends on the housing 11, thereby the locking arm part 23*b* is elastically displaceable in upward and downward directions. In addition, when viewed from the left-right direction (Y-axis direction), the locking protruding part 23*a* is formed with an inclined surface on the front side inclined in the front-to-back direction and a vertical surface orthogonal to the front-to-back direction on the rear side.

Therefore, while the front surface 11*f* of the connector 10 is being inserted through the insertion opening 92 of the wall member 91, as the connector 10 advances relative to the wall member 91, the edge of the insertion opening 92 moves backward relative to the outer surface of the locking arm part 23*b* and slides along the inclined surface of the locking protruding part 23*a*; therefore, the locking protruding part 23*a* is smoothly displaced. Furthermore, when the insertion opening 92 reaches the rear end of the locking protruding part 23*a*, the locking protruding part 23*a* is elastically restored and a vertical surface of the locking protruding part 23*a* opposes the outer edge part of the insertion opening 92 on the front surface of the wall member 91 preventing retracting of the connector 10 relative to the wall member 91.

In addition, the protruding part 24 includes a lock facing part 24*a* and the front surface of this lock facing part 24*a* is a vertical surface that is orthogonal to the front-to-back direction. Furthermore, as described above, when the insertion opening 92 reaches the rear end of the locking protruding part 23*a*, the vertical surface of the lock facing part 24*a* opposes the outer edge of the insertion opening 92 on the rear surface of the wall member 91; therefore, the connector 10 can not move forward relative to the wall member 91.

In other words, the front surface 11*f* of the connector 10 is inserted into the insertion opening 92 of the wall member 91 and when the insertion opening 92 reaches the rear end of the locking protruding part 23*a*, the vertical surface of the locking protruding part 23*a* opposes the outer edge of the insertion opening 92 on the front surface of the wall member 91 and the vertical surface of the lock facing part 24*a* opposes the outer edge of the insertion opening 92 on the rear surface of the wall member 91. Thereby, the wall member 91 achieves a sandwiched state between the vertical surface of the locking protruding part 23*a* and the vertical surface of the lock facing part 24*a* and the connector 10 is securely mounted to the wall member 91.

In addition, the connector 10 includes an elastomer 31 as an elastic member integrally formed using an insulating material that has elasticity such as a thermoset elastomer. Note that the thermoset elastomer is, for example, a polyester based elastomer or an olefin based elastomer but is not limited to these and may be any type, such as a urethane based elastomer, a styrene based elastomer, or the like. The elastomer 31 is combined with the housing 11, and is not tightly integrated with the housing 11, but rather is separate from the housing 11 and is a member independent from the housing 11. For example, after the structural material of the housing 11 is formed into a prescribed shape using injection molding and solidified, structural material for the elastomer 31 is filled by injection molding into an elastomer stowing space 16, described below, formed in the housing 11, and thereby an elastomer 31 that is in a state separate from the housing 11 while in a state of being combined with the housing 11 can be obtained.

In the example illustrated in the figures, for each single unit of the housing 11, there are two, in other words, a pair of elastomers 31. Furthermore, the elastomers 31 are combined with the housing 11 on both left and right ends of the housing 11 and are exposed on the upper surface 11*a*, lower surface 11*b*, side surfaces 11*s*, front surface 11*f*, and rear surface 11*r* of the housing 11. In addition, long narrow ribs 33 extending in the mating direction of the counterpart connector 101, in other words, the front-to-back direction, are provided on the portions of the elastomers 31 exposed on the upper surface 11*a*, the lower surface 11*b*, and the side surfaces 11*s* and at least a portion of these ribs 33 are able to contact the inner surface of the insertion opening 92. Specifically, a protruding part 33*a* is formed on at least a portion of each of the ribs 33 as a square part protruding outward and at least the tip of the protruding parts 33*a* protrude outward (upward, downward, and in left and right directions) beyond the upper surface 11*a*, the lower surface 11*b* and the side surfaces 11*s* of the housing 11, and the tips come into contact with the inner surfaces of the insertion opening 92 in a state where the connector 10 is inserted into the insertion opening 92, and are elastically deformed.

Note that the elastomers 31 are respectively positioned on both left and right sides of the housing 11 in the width direction and may be a pair that are left and right symmetrical, but do not necessarily need to be a pair, and may be two or more pairs; however, in the present embodiment, the case of a pair being used will be described.

The counterpart connector 101 includes a counterpart housing 111 as a counterpart connector body integrally formed using an insulating material like a synthetic resin such as polybutylene terephthalate (PBT) resin or the like containing roughly 15% glass fiber.

The counterpart housing 111 is a substantially rectangular body with an external shape elongated in the width direction (Y-axis direction). Furthermore, the counterpart housing 111 includes: a main body part 111*a* positioned on the side where the FPC 191 is inserted, and a mating part 111*b* connected to the front surface (surface facing the connector 10) of the main body part 111*a* that mates with the connector 10. In addition, a flat plate shaped flange part 111*c* is formed extending in the width direction (Y-axis direction) between the main body part 111*a* and the mating part 111*b*.

The mating part 111*b* includes mating side parts 112*b* positioned on both ends thereof in the width direction (Y-axis direction), having a polygonal column type shape, and extending from the flange part 111*c* toward the connector 10 and a mating main part 112*a* demarcated on the left and right ends by the mating side parts 112*b*. Furthermore, a mating recessed part 112*c* is formed as a recessed part where the mating part 111*b* is missing in the middle of the mating main part 112*a* in the width direction (Y-axis direction). As viewed from the vertical direction (Z-axis direction), the mating recessed part 112*c* is a substantially rectangular space recessed so as to reach from the front end surface of the mating main part 112*a* to the flange part 111*c* and the mating main part 112*a* is divided into left and right by the mating recessed part 112*c*.

When the connector 10 and the counterpart connector 101 are mated, the mating main part 112*a* divided into left and right parts is inserted and stowed in the housing 11 divided into each of left and right insertion recessed parts 13, the mating column part 12*c* of the housing 11 advances into and is stowed in the mating recessed part 112*c*, and the flange part 111*c* approaches or comes into contact with the front surface 11*f* and the rear surface 11*r* of the housing 11.

In addition, a counterpart lock member 121 as a mated state retaining device for maintaining a mated state with the connector 10 is formed in the center in the width direction (Y-axis direction) of the upper surface (Z-axis positive direction surface) of the counterpart housing 111. When the connector 10 is mated to the counterpart connector 101, the counterpart lock member 121 engages and locks with the front locked part 21*f* and/or rear locked part 21*r* of the housing 11, so the connector 10 and the counterpart connector 101 are mutually locked together. In addition, a secondary lock member 122 as a connector position assurance mechanism (CPA) is attached to the rear side (side opposite the connector 10) of the counterpart lock member 121. The secondary lock member 122 functions similar to a typical CPA where upon completing mating of the connector 10 and the counterpart connector 101 and with the counterpart lock member 121 locked with the connector 10, the secondary lock member is a member that is slid in the direction of the connector 10 and that prevents movement of the counterpart lock member 121 in a mating release direction.

Furthermore, a board insertion recessed part 113 is formed in the counterpart housing 111 as an FPC insertion recessed part, and at least a portion near the front end of the FPC 191 is inserted. The board insertion recessed part 113 is a recessed part that extends in the front-to-back direction (X-axis direction) and is open at the rear surface (surface opposite the connector 10) of the main body part 111*a* as a long narrow slit extending in the width direction (Y-axis direction). In addition, the board insertion recessed part 113 extends in the front-to-back direction inside the mating part 111*b* divided into each of left and right mating main parts 112*a* and the front surface of each of the mating main parts 112*a* is open (surface facing the connector 10). Furthermore, a plurality of long and narrow ribs 114 extending in the front-to-back direction protrude from the upper surface and/or the lower surface inside the board insertion recessed part 113. The upper side and/or lower side surface of the FPC 191 inserted into the board insertion recessed part 113 slides along the surface of the long and narrow ribs 114 so reducing the sliding resistance can enable smoother sliding.

Note that the FPC 191 is typically a long strip shaped member; however, for convenience of description, illustration of the portion separated by more than a prescribed distance from the front end is omitted. Furthermore, a flat plate shaped reinforcement plate 192 is attached to the back side surface (Z-axis negative direction side) of the FPC 191 main body within a prescribed length range of the front end. This reinforcement plate 192 is composed of, for example, an insulating resin film or the like and is desirably adhered to the back side surface of the main body by an adhesive or the like as a reinforcing member. The prescribed length is desirably such that when the FPC 191 is mounted to the counterpart connector 101, the area near the rear end of the reinforcement plate 192 is visible.

In addition, with the front side surface (Z-axis positive direction side) of the FPC 191 main body, at a prescribed range from the front end, the insulative coating is removed and conductor wires 193 are exposed. A plurality of conductor wires 193 (for example, roughly 12) extend in the longitudinal direction (X-axis direction) of the FPC 191 and are arranged parallel at a prescribed pitch (for example, roughly 1 to 2 [mm]). Furthermore, the number and pitch of the conductor wires 193 correspond to and are suitably changed according to the number and pitch of the terminals 61 of the connector 10. For convenience of illustration, only a portion of the conductor wires 193 are shown, and the other portion is not illustrated.

The FPC 191 has a bifurcated tip and a separation part (not shown) recessed to the rear (X axis negative direction) is formed in the center of the front end in the width direction (Y-axis direction). The separation part is a space where the FPC 191 is missing and is a space formed corresponding to the mating recessed part 112*c*.

Furthermore, as illustrated in FIG. 1 to FIG. 3, in a state of being inserted into the insertion opening 92, when the first counterpart connector 101A and the second counterpart connector 101B having the FPC 191 attached thereto are mated to the connector 10 mounted to the wall member 91, each of the conductor wires 193 of the FPC 191 attached to the first counterpart connector 101A electrically conduct with each of the conductor wires 193 of the FPC 191 attached to the second counterpart connector 101B via the terminals 61 provided in the connector 10. Therefore, the FPC 191 positioned on a first side of the wall member 91 is mutually connected with the FPC 191 positioned on a second side of the wall member 91.

Next, the details of the configuration of the connector 10 will be described.

Figure 5:
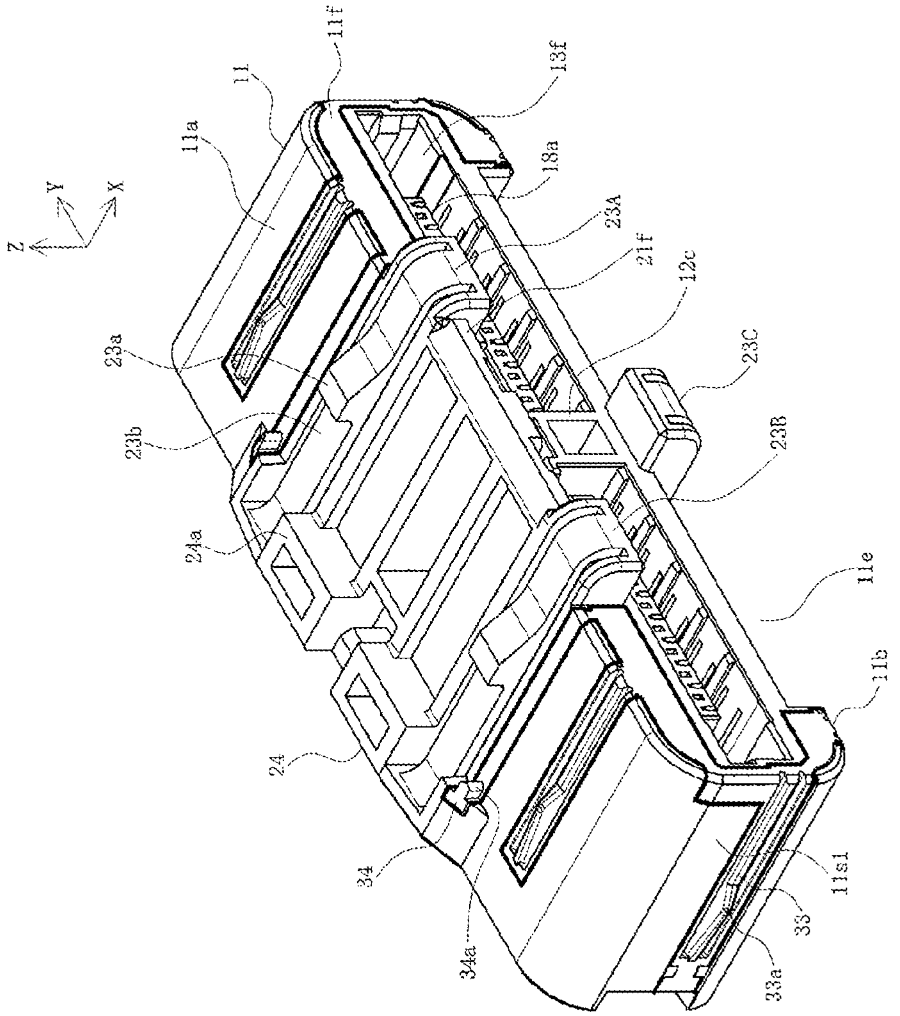
FIG. 5 is a perspective view of the connector in Embodiment 1, viewed obliquely from above and the front.
Figure 6:
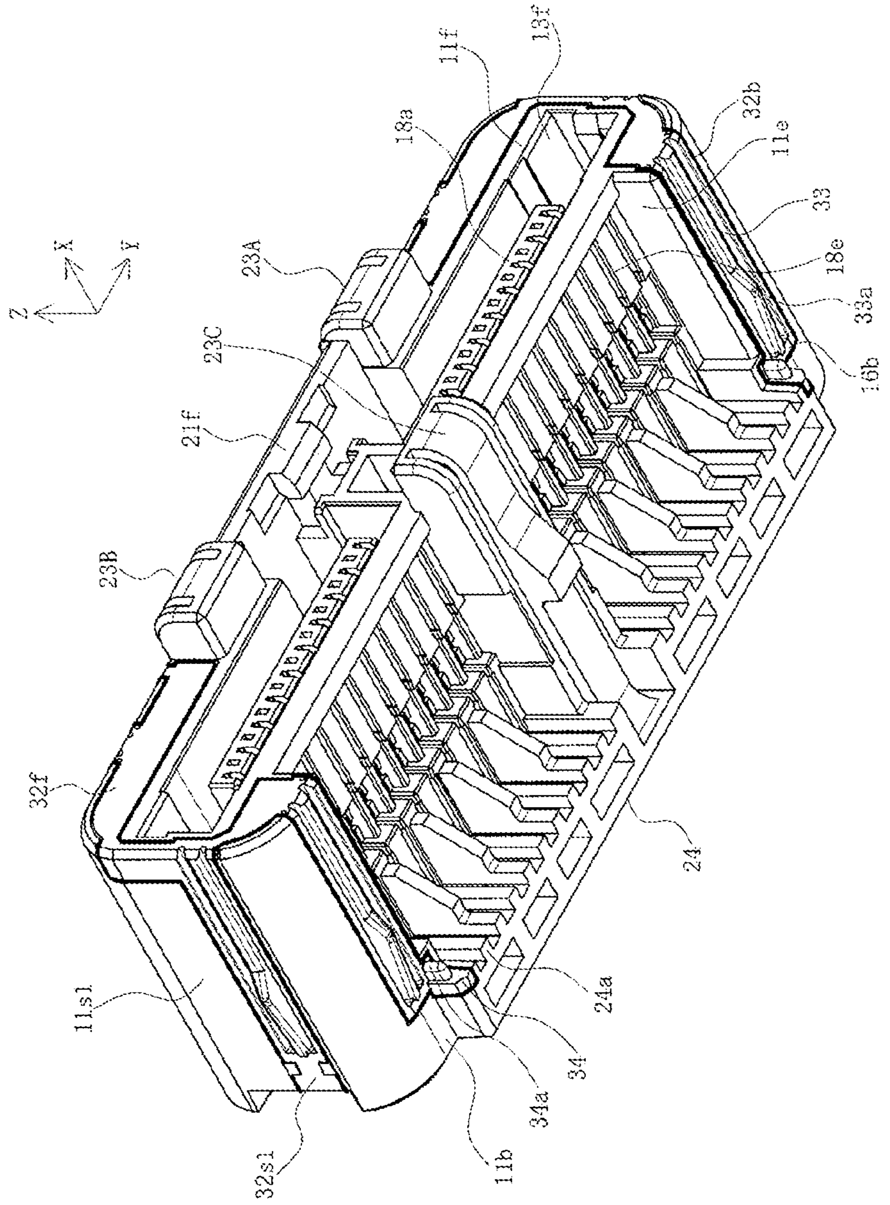
FIG. 6 is a perspective view of the connector in Embodiment 1, viewed obliquely from below and the front.
Figure 7:
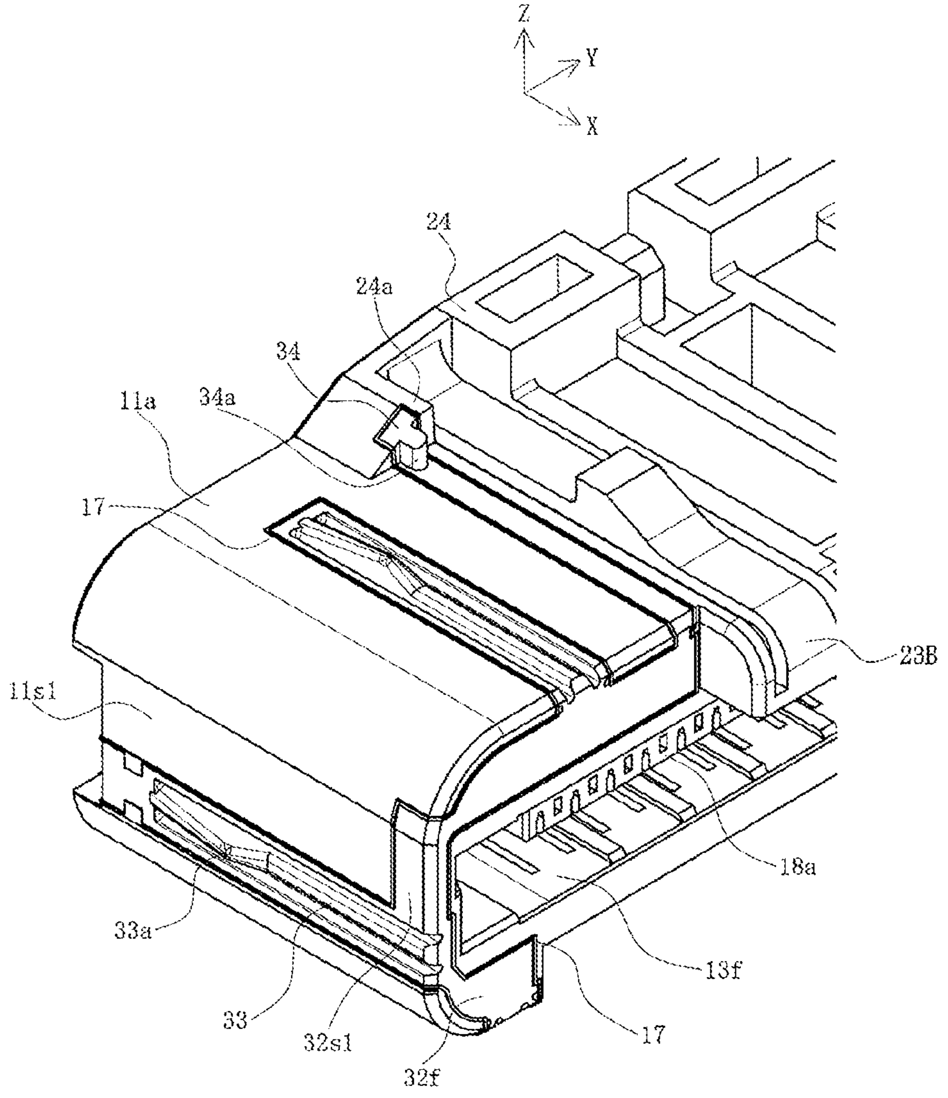
FIG. 7 is an enlarged view of the essential parts in FIG. 5.
Figure 8:
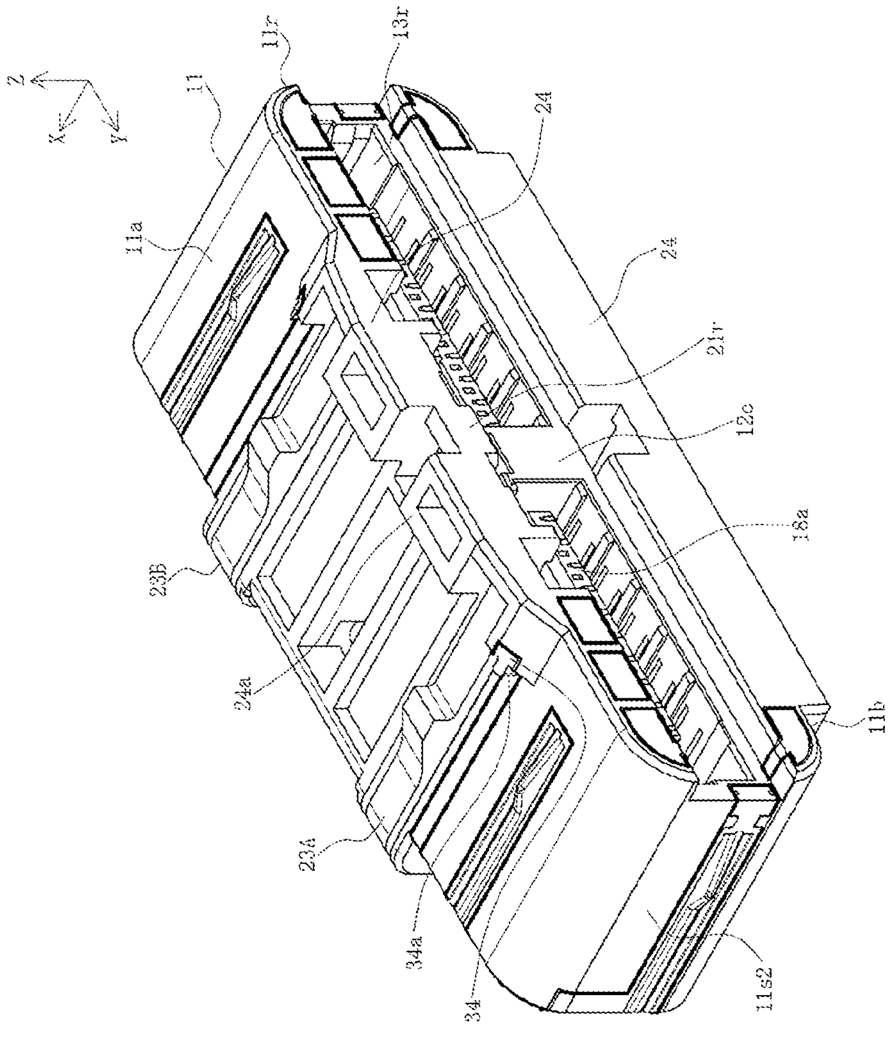
FIG. 8 is a perspective view of the connector in Embodiment 1, viewed obliquely from above and the rear.
Figure 9:
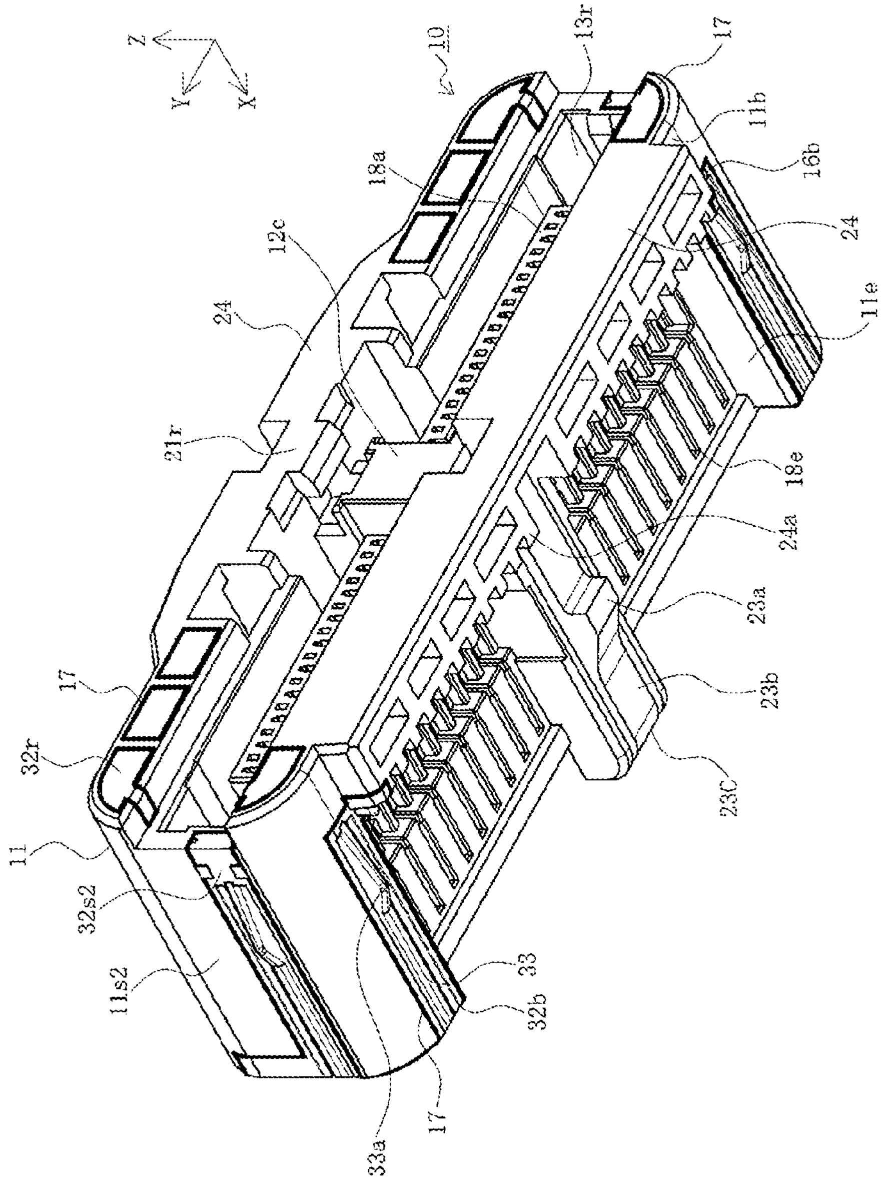
FIG. 9 is a perspective view of the connector in Embodiment 1, viewed obliquely from below and the rear.
Figure 10:
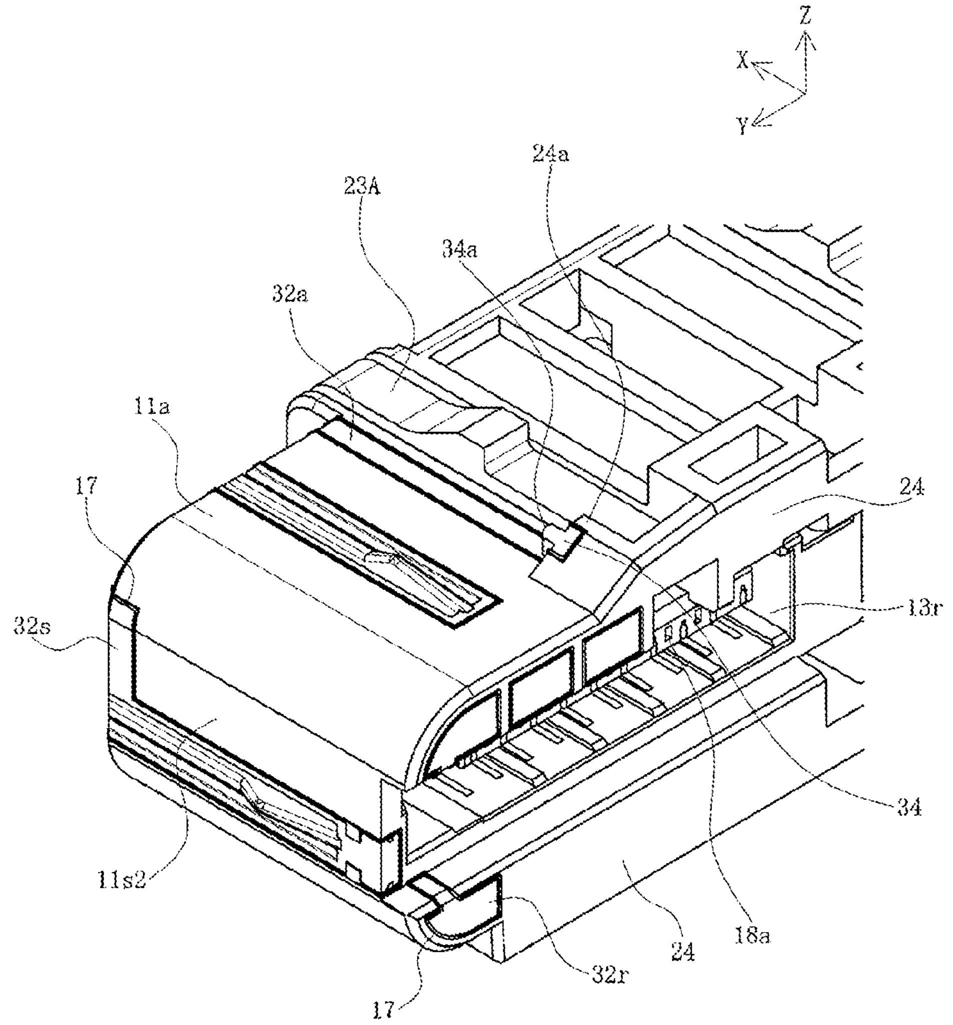
FIG. 10 is an enlarged view of the essential parts in FIG. 8.
Figure 11A:
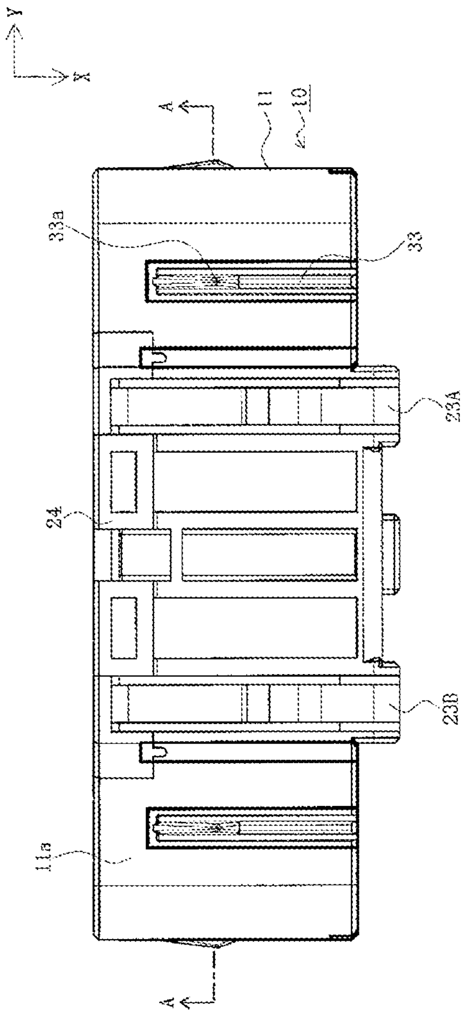
FIGS. 11A and 11B are two-plane views of the connector according to Embodiment 1, where
Figure 11B:
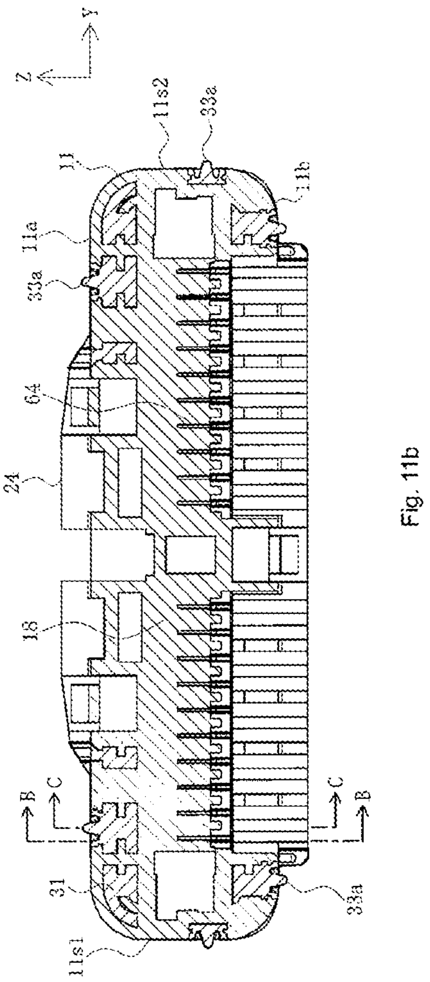
Figure 12:
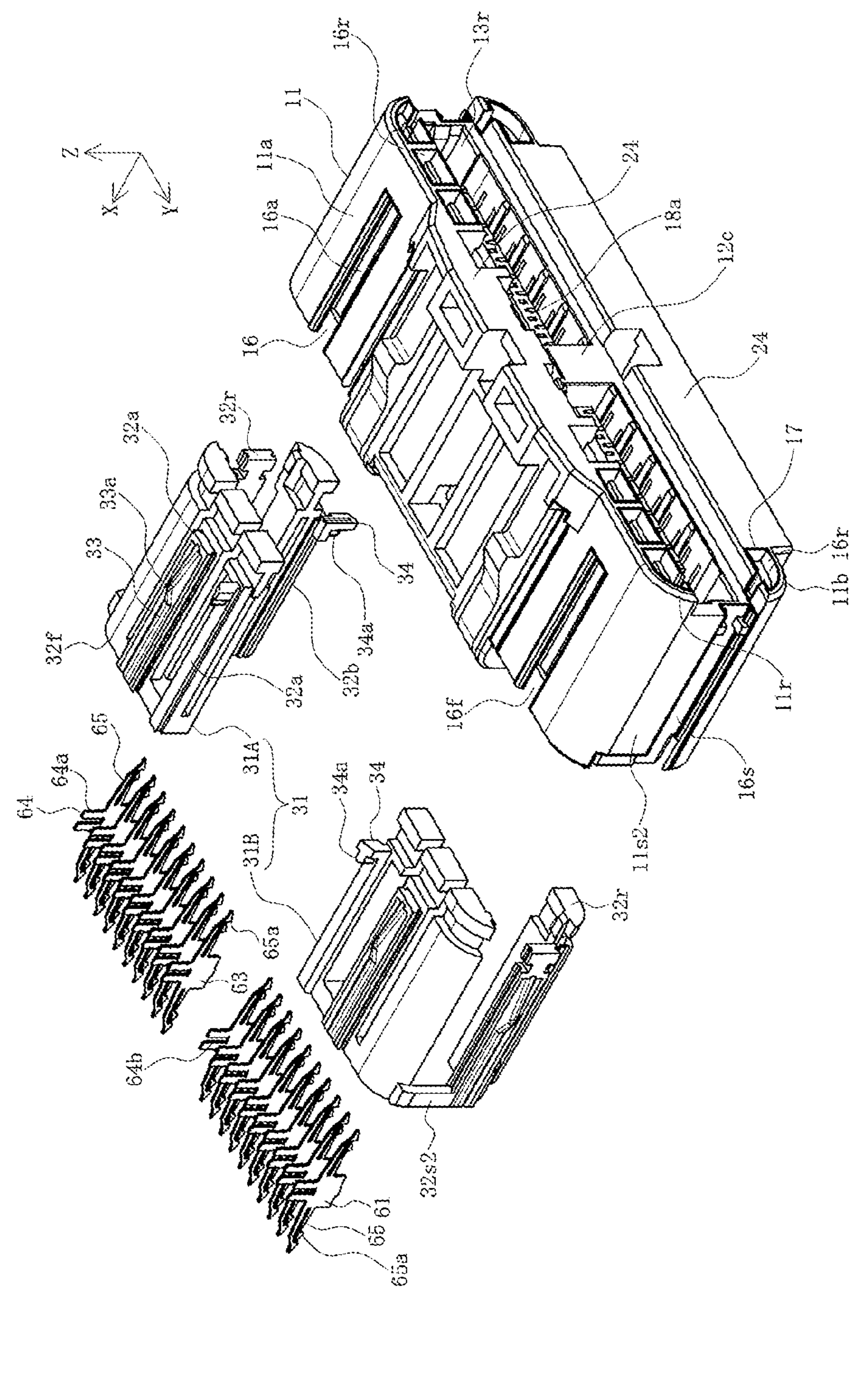
FIG. 12 is an exploded perspective view of the connector in Embodiment 1, viewed obliquely from above and the rear.
Figure 13:
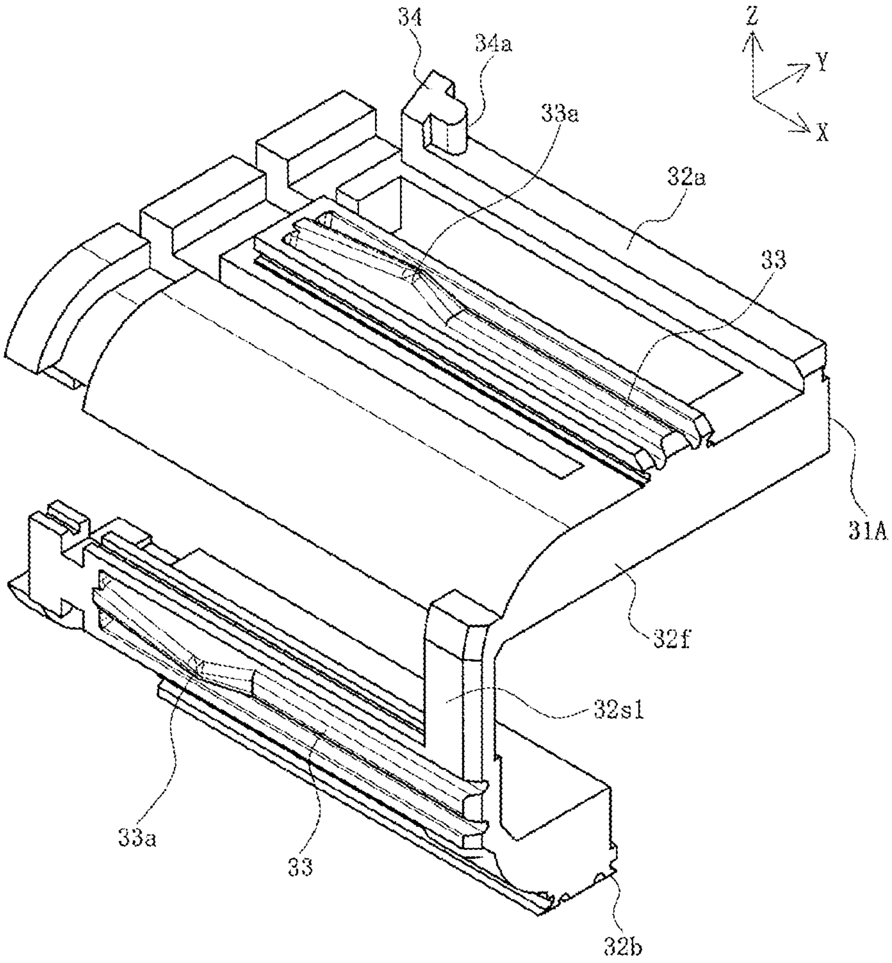
FIG. 13 is a perspective view of a first elastomer in Embodiment 1, viewed obliquely from above and the front.
Figure 14:
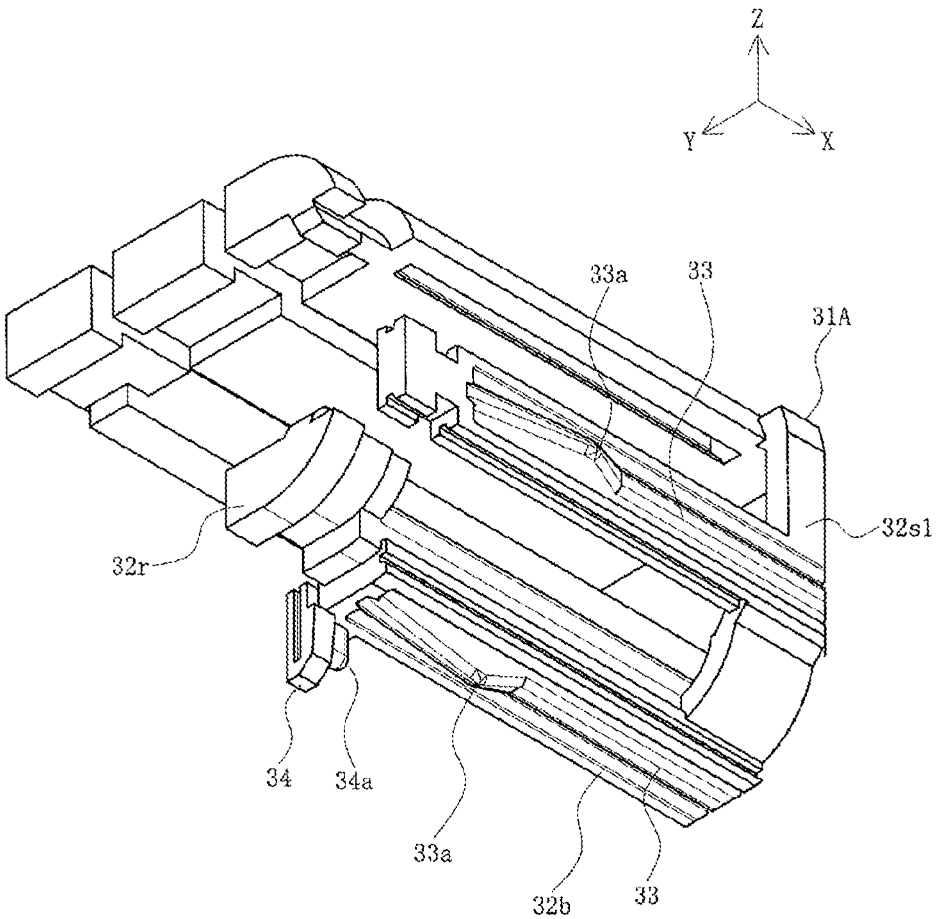
FIG. 14 is a perspective view of a first elastomer in Embodiment 1, viewed obliquely from below and the rear.
Figure 15A:
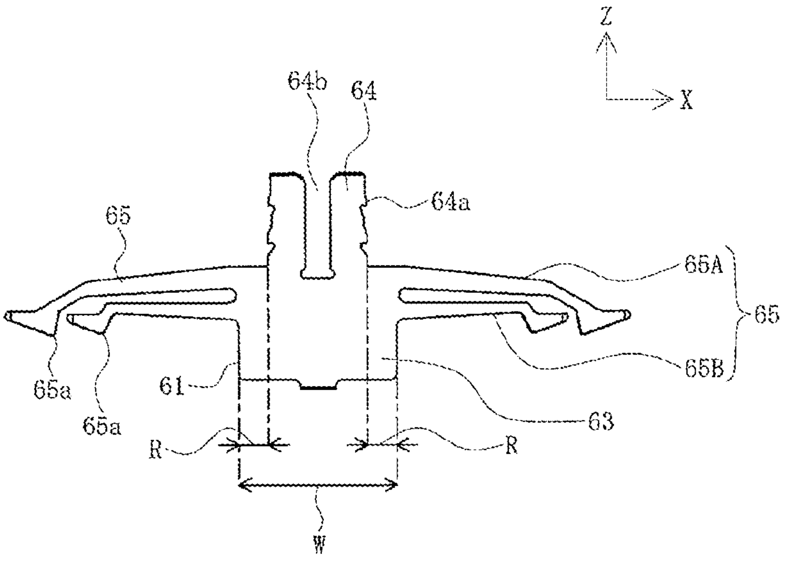
FIGS. 15A and 15B are side views of a terminal according to Embodiment 1, where
Figure 15B:
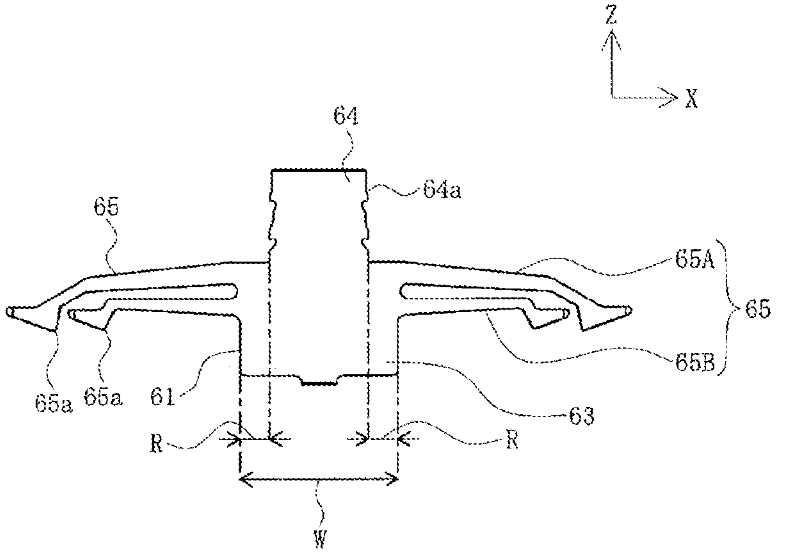
Figure 16A:
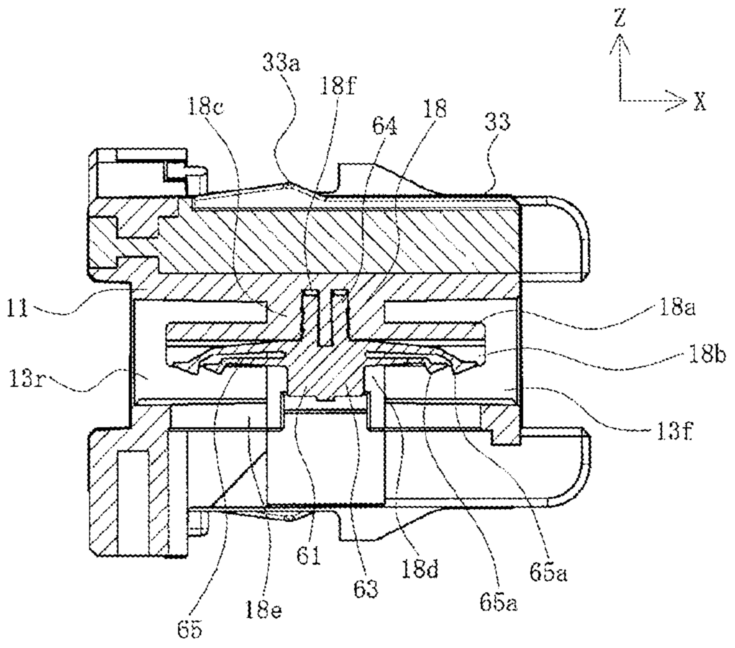
FIGS. 16A and 16B are side cross section views of the connector according to Embodiment 1, where
Figure 16B:
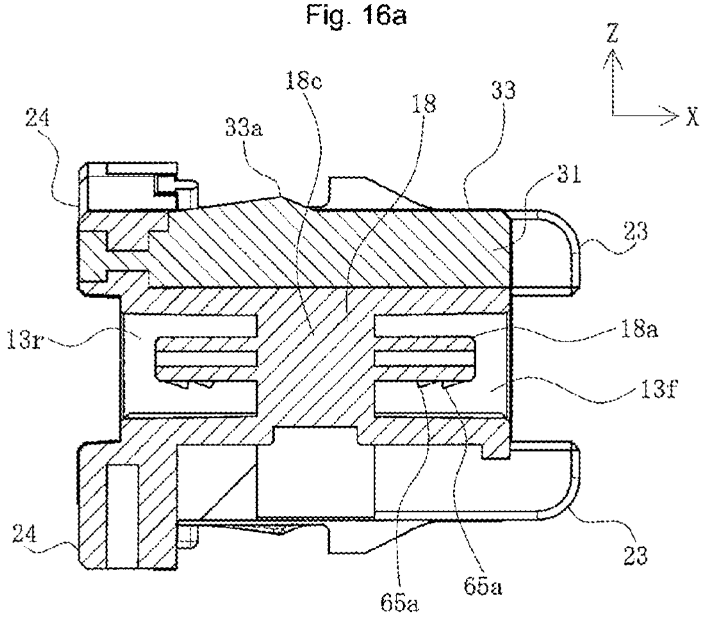
Figure 17:
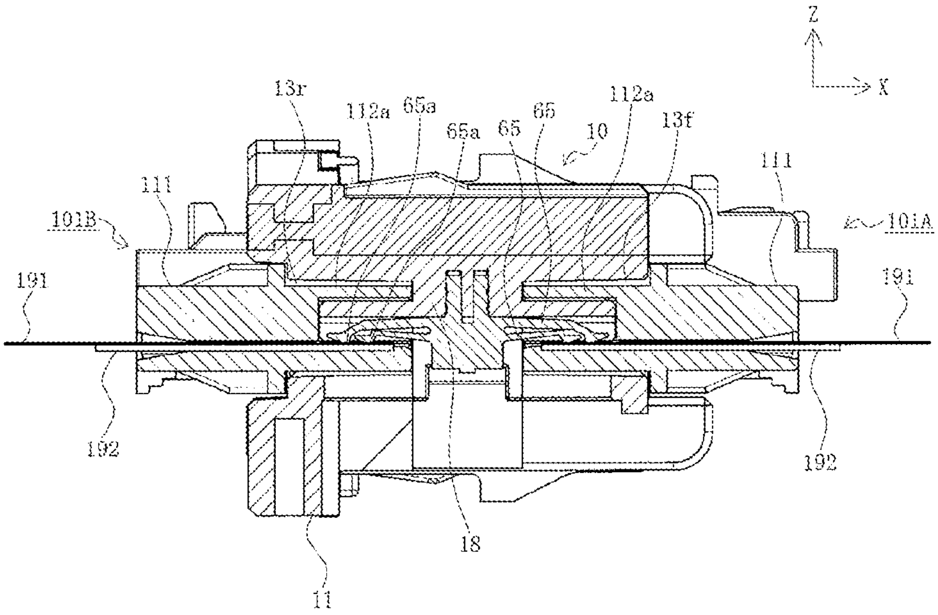
FIG. 17 is a side cross section view illustrating a state in which the first and second counterpart connectors are mated to the connector according to Embodiment 1.

FIG. 5 is a perspective view of the connector in Embodiment 1, viewed obliquely from above and the front, FIG. 6 is a perspective view of the connector in Embodiment 1, viewed obliquely from below and the front, FIG. 7 is an enlarged view of the essential parts in FIG. 5, FIG. 8 is a perspective view of the connector in Embodiment 1, viewed obliquely from above and the rear, FIG. 9 is a perspective view of the connector in Embodiment 1, viewed obliquely from below and the rear, FIG. 10 is an enlarged view of the essential parts in FIG. 8, FIGS. 11A and 11B are two-plane views of the connector according to Embodiment 1, FIG. 12 is an exploded perspective view of the connector in Embodiment 1, viewed obliquely from above and the rear, FIG. 13 is a perspective view of a first elastomer in Embodiment 1, viewed obliquely from above and the front, FIG. 14 is a perspective view of a first elastomer in Embodiment 1, viewed obliquely from below and the rear, and FIGS. 15A and 15B are side views of the first terminal of Embodiment 1. FIGS. 16A and 16B are side cross section views of the connector according to Embodiment 1, and FIG. 17 is a side cross section view illustrating a state in which the first and second counterpart connectors are mated to the connector according to Embodiment 1. Note that in FIGS. 11A and 11B, FIG. 11A is top view and FIG. 11B is a cross section view taken along the line A-A in FIG. 11A, In FIGS. 15A and 15B, FIG. 15A is a side view of a preferred example, and FIG. 15B is a side view of a modified example, In FIGS. 16A and 16B, FIG. 16A is a cross section view taken along the line B-B in FIG. 11B and FIG. 16B is a cross section view taken along the line C-C in FIG. 11B.

The terminal 61 of the connector 10 in the present embodiment is a thin plate member manufactured by punching or the like processing of a conductive metal plate that extends on the X-Z plane. As illustrated in FIGS. 15A to 17 and the like, the terminals have a shape that is left-right symmetrical as viewed from the side (viewed from the Y-axis direction). The terminals include a substantially rectangular shaped main body part 63, an anchor part 64 extending upward (Z-axis positive direction) from the upper side of the main body part 63, and a first contact part 65A and a second contact part 65B extending respectively forward (X-axis positive direction) and backward (X-axis negative direction) from near the top end of the side edge of the main body part 63.

As illustrated in the figures, the total length of the first contact part 65A is longer than that of the second contact part 65B, the free end thereof is separated further from the main body part 63 than the free end of the second contact part 65B, and is positioned above the second contact part 65B. Note that the first contact part 65A and the second contact part 65B may collectively be described as a contact part 65. Each of the contact parts 65 are cantilever type members and have a contact protruding part 65*a* that swells downward (Z-axis negative direction) formed at the free end thereof. Furthermore, the contact protruding part 65*a* of the first contact part 65A and the contact protruding part 65*a* of the second contact part 65B are lined up to the front of and to the rear of the main body part 63.

In addition, the anchor part 64 is formed narrower (dimension in X-axis direction is short) than the main body part 63 and stepped sections for biting into and securing to the housing 11 are formed at the side edge on the front and rear of the anchor part 64 and function as an anchor 64*a*. Note that in a state of only the first counterpart connector 101A being inserted into the connector 10 and only one FPC 191 being connected to the contact parts 65 (right side of FIGS. 15A to 17), a rotational moment in the counter clockwise direction in FIGS. 15A to 17 is exerted on the terminals 61 causing a downward (Z-axis negative direction) bias on the contact parts 65 on the other side (left side of FIGS. 15A to 17). If the second counterpart connector 101B is inserted in this state, the terminals 61 may be broken. Therefore, the orientation of the terminals 61 secured in the housing 11 should be stabilized so that the contact parts 65 are not biased downward. Furthermore, the distance between front and rear anchors 64*a* is desirably large in order to stabilize the orientation of the terminals 61 secured in the housing 11. For example, as illustrated in FIGS. 15A and 15B, setting the width of the main body part 63 (dimension in X-axis direction) as W and setting the distance from the front and rear anchors 64*a* to the front and rear edges of the main body part 63 as R, having $R<W/4$ is desirable.

Note that as illustrated in FIG. 15A, a groove shaped cavity part 64*b* extending in the vertical direction (Z-axis direction) is desirably formed on the anchor part 64 in the center in the front-to-back direction. In other words, as illustrated in FIG. 15A, having the anchor part 64 formed with a bifurcated tip is desirable. However, if necessary, as illustrated in FIG. 15B, the cavity part 64*b* can be omitted. Note that in the present embodiment, an example of the anchor part 64 having a bifurcated tip will be described for convenience of description.

Furthermore, as illustrated in FIG. 12, a plurality of terminals 61 are lined up with a prescribed pitch in the width direction (Y-axis direction) of the housing 11. Each of the terminals 61 come into contact with and conduct with the conductor wires 193 of the FPC 191 so the number and pitch thereof are set corresponding to the number and pitch of the conductor wires 193 of the FPC 191.

In addition, as illustrated in FIG. 11B and FIGS. 16A and 16B, the housing 11 includes a terminal retention part 18 formed near the center in the front-to-back direction (X-axis direction) thereof. The terminal retention part 18 includes the forward insertion recessed part 13*f* that is open at the front surface 11*f*, a center part 18*c* that separates the rearward insertion recessed part 13*r* open at the rear surface 11*r*, and insertion recessed part intermediate plates 18*a* extending respective from this center part 18*c* into the forward (X-axis positive direction) and rearward (X-axis negative direction) directions. The insertion recessed part intermediate plate 18*a* is a plate shaped member extending in the front-to-back direction and the width direction of the housing 11 within the forward insertion recessed part 13*f* and the rearward insertion recessed part 13*r*.

Furthermore, a plurality of slit shaped terminal stowing recessed parts 18*d* into which each of the main body parts 63 of the terminals 61 is inserted are arranged on the center part 18*c* at a prescribed pitch in the width direction (Y-axis direction) of the housing 11. The number and pitch of the terminal stowing recessed parts 18*d* are set corresponding to the number and pitch of the terminals 61. The lower end of each of the terminal stowing recessed parts 18*d* is open to enable inserting the main body parts 63 of the terminals 61 from below. Furthermore, slit shaped anchor stowing parts 18*f* extending upwards are formed continuous with the upper end of each of the terminal stowing recessed parts 18*d*. The anchor parts 64 of each of the terminals 61 are stowed in the anchor stowing parts 18*f* and the anchors 64*a* of the anchor parts 64 bite into and are secured to the inner surfaces of corresponding anchor stowing parts 18*f*.

In addition, the front (X-axis positive direction) and rear (X-axis negative direction) ends of each of the terminal stowing recessed parts 18*d* communicate with each of the contact part stowing grooves 18*b* formed in the insertion recessed part intermediate plate 18*a*. These contact part stowing grooves 18*b* are slit shaped grooves formed extending in the front-to-back direction (X-axis direction), are open on the lower surface (Z-axis negative direction side) of each of the insertion recessed part intermediate plates 18*a*, and have the contact parts 65 of each of the terminals 61 stowed therein. Therefore, displacement of the contact parts 65 in the width direction (Y-axis direction) of the housing 11 is suppressed, and thus deformation of the contact parts 65 can be prevented. Note that as illustrated in FIGS. 16A and 16B, at least the tip of the contact protruding parts 65*a* of the contact parts 65 are set protruding downward (Z-axis negative direction) below the lower surface of the insertion recessed part intermediate plates 18*a*.

Therefore, as illustrated in FIG. 17, when the first counterpart connector 101A and the second counterpart connector 101B having a FPC 191 attached thereto are mated with the connector 10, each of the conductor wires 193 of the FPC 191 attached to the first counterpart connector 101A and to the second counterpart connector 101B come into contact with the tip of the contact protruding part 65*a* that protrudes below the lower surface of an insertion recessed part intermediate plate 18*a* and conducts with the terminals 61. In this case, the tips of two contact protruding parts 65*a* lined up in the front-to-back direction (X-axis direction) are in contact with each of the conductor wires 193 of the FPC 191 so the state of conducting of the terminals 61 with each of the conductor wires 193 is reliably maintained. Thus, each of the conductor wires 193 of the FPC 191 attached to the first counterpart connector 101A conduct with each of the conductor wires 193 of the FPC 191 attached to the second counterpart connector 101B via the terminals 61 of the connector 10.

As illustrated in FIGS. 6, 9, and the like, a lower end of a plurality of terminal insertion slits 18*e* are open at the ceiling surface of the lower recessed part 11*e* of the housing 11. Each terminal insertion slit 18*e* is formed at a position corresponding to each terminal stowing recessed part 18*d* and contact part stowing groove 18*b* and is set with a length corresponding to the front-to-back direction (X-axis direction) dimension of each terminal 61. Thereby, each of the terminals 61 can be inserted and attached from below the housing 11, through each of the terminal insertion slits 18*e* opened in the ceiling surface of the lower recessed parts 11*e*, and into the corresponding terminal stowing recessed parts 18*d*, anchor stowing parts 18*f*, and contact part stowing grooves 18*b*. Note that if necessary, a bottom cover member (not shown) can be attached to the housing 11 to cover the bottom side of the lower recessed parts 11*e* after completion of attaching the terminals 61 to the housing 11.

In the present embodiment, there are two, in other words, a pair of elastomers 31, specifically, as illustrated in FIG. 12, a right side elastomer 31A and a left side elastomer 31B. Note that the right side elastomer 31A and the left side elastomer 31B are members that are mutually symmetrical about an X-Z plane (vertical plane) of symmetry that passes through the center of the housing 11 in the width direction and these members may be collectively described as elastomer 31.

The elastomer 31 has exposed surfaces exposed at various locations on the surface of the housing 11, including for example, an upper exposed surface 32*a*, lower exposed surface 32*b*, right side exposed surface 32*s*1, left side exposed surface 32*s*2, front exposed surface 32*f*, and rear exposed surface 32*r*, exposed respectively on the upper surface 11*a*, the lower surface 11*b*, the right side surface 11*s*1, the left side surface 11*s*2, the front surface 11*f*, and the rear surface 11*r*. Note that the right side exposed surface 32*s*1 and the left side exposed surface 32*s*2 may collectively be described as a side exposed surface 32*s*. In addition, the front exposed surface 32*f* and the rear exposed surface 32*r* are exposed on the front surface 11*f* and the rear surface 11*r* that are mating surfaces of the housing 11 and are also called mating exposed surfaces. Furthermore, the upper exposed surface 32*a*, lower exposed surface 32*b*, right side exposed surface 32*s*1, and left side exposed surface 32*s*2 are exposed respectively on the upper surface 11*a*, lower surface 11*b*, right side surface 11*s*1, and left side surface 11*s*2, that are the first side wall surface, second side wall surface, third side wall surface, and fourth side wall surface of the housing 11; therefore, these are called the first side wall exposed surface, second side wall exposed surface, third side wall exposed surface, and fourth side wall exposed surface and may collectively be called side wall exposed surfaces.

The exposed surfaces of the elastomer 31 are substantially flush with the surrounding surfaces of the housing 11. In addition, the side wall exposed surfaces of the elastomer 31, in other words, the upper exposed surface 32*a*, lower exposed surface 32*b*, and side exposed surfaces 32*s* have long narrow ribs 33 extending in the mating direction, in other words, the front-to-back direction formed thereon and at least a portion of the ribs 33 can come into contact with the inner surface of the insertion opening 92. Specifically, a protruding part 33*a* is formed on at least a portion of each of the ribs 33 protruding outward and at least the tip of the protruding parts 33*a* protrude outward (upward, downward, and in left and right directions) beyond the upper surface 11*a*, the lower surface 11*b* and the side surfaces 11*s* of the housing 11, and the tips come into contact with the inner surfaces of the insertion opening 92 in a state where the connector 10 is inserted into the insertion opening 92, and are elastically deformed.

In addition, lock facing parts 34 that protrude upward and downward are formed respectively on the upper exposed surface 32*a* and the lower exposed surface 32*b* in positions near the center in the width direction of the housing 11 and toward the rear exposed surface 32*r*. A protruding part 34*a* is formed on these lock facing parts 34. At least the tip of the protruding part 34*a* protrudes outside (forward) the vertical surface of the lock facing part 24*a* of the housing 11 and is elastically deformed by coming into contact with the rear surface of the wall member 91 where the wall member 91 is in a state of being sandwiched from the front and back by the vertical surface of the locking protruding part 23*a* and the vertical surface lock facing part 24*a*.

Note that the protruding part 34*a* of the lock facing part 34 and the protruding part 33*a* of the rib 33 on the upper exposed surface 32*a* are positioned to the outside of the locking arm part 23*b* of the locking member 23 in the width direction of the housing 11. In addition, the protruding part 34*a* of the lock facing part 34 and the protruding part 33*a* of the rib 33 on the lower exposed surface 32*b* are also positioned to the outside of the locking arm part 23*b* of the locking member 23 in the width direction of the housing 11.

As illustrated in FIG. 12, the elastomer stowing space 16 for stowing the elastomer 31 is formed in the housing 11. The elastomer stowing space 16 has openings at various locations on the surface of the housing 11, for example an upper surface opening 16*a*, a lower surface opening 16*b*, a side surface opening 16*s*, a front surface opening 16*f*, and a rear surface opening 16*r* are respectively on the upper surface 11*a*, the lower surface 11*b*, the side surface 11*s*, the front surface 11*f*, and the rear surface 11*r*. Furthermore, a contour protruding part 17 is formed on the peripheral edge of each opening of the elastomer stowing space 16 on the surface of the housing 11. In other words, the contour protruding part 17 is formed along the contour of the exposed surface of the elastomer 31. The contour protruding part 17 protrudes, for example, roughly 0.1 [mm] from the surface of the housing 11, is a portion like a wall extending continuously surrounding the peripheral edge of each opening of the elastomer stowing space 16, and in the molding process of the elastomer 31, prevents the composition material of the elastomer 31 filled in the elastomer stowing space 16 from leaking out of the opening of the elastomer stowing space 16. Thereby the composition material of the elastomer 31 is prevented from leaking out of the opening, hardening, and remaining as a burr.

Next, the operation of mating the aforementioned connector 10 and counterpart connector 101 configuration will be described.

Here, attaching of the FPC 191 respectively to the first counterpart connector 101A and the second counterpart connector 101B is assumed to be complete.

First, the operator attaches the connector 10 to the wall member 91. Specifically, while the front surface 11*f* of the connector 10 is being inserted through the insertion opening 92 of the wall member 91, as the connector 10 advances relative to the wall member 91, the edge of the insertion opening 92 moves backward relative to the outer surface of the locking arm part 23*b* and slides along the inclined surface of the locking protruding part 23*a*; therefore, the locking protruding part 23*a* is smoothly displaced. Furthermore, when the insertion opening 92 reaches the rear end of the locking protruding part 23*a*, the locking protruding part 23*a* is elastically restored and a vertical surface of the locking protruding part 23*a* opposes the outer edge part of the insertion opening 92 on the front surface of the wall member 91 preventing retracting of the connector 10 relative to the wall member 91. In addition, the vertical surface of the lock facing part 24*a* of the housing 11 protruding part 24 faces the outer edge part of the insertion opening 92 on the rear surface of the wall member 91 preventing the connector 10 from advancing relative to the wall member 91. Thereby, the wall member 91 achieves a sandwiched state between the vertical surface of the locking protruding part 23*a* and the vertical surface of the lock facing part 24*a* and the connector 10 is securely mounted to the wall member 91.

Herein, at least a tip of the lock facing part 34 protruding part 34*a* of the elastomer 31 combined with the housing 11 protrudes outside of the vertical surface of the lock facing part 24*a* of the housing 11 so the protruding part 34*a* comes into contact with the rear surface of the wall member 91 and is elastically deformed. Therefore, even if there is a gap between the front and rear surfaces of the wall member 91 and the vertical surfaces of the locking protruding part 23*a* and the lock facing part 24*a* due to relatively low dimensional accuracy (relatively high dimensional tolerance) of the thickness of the wall member 91, the elastically deformed protruding part 34*a* is interposed in this gap so looseness does not occur.

In addition, at least the tips of the protruding parts 33*a* of the ribs 33 on the elastomers 31 protrude outside (upward, downward, leftward, and rightward) the upper surface 11*a*, lower surface 11*b*, and side surfaces 11*s* of the housing 11 so with the connector 10 inserted into the insertion opening 92, the tips come into contact with the inner surface of the insertion opening 92 and are elastically deformed. Therefore, even if there is a gap between the inner surface of the insertion opening 92 and the upper surface 11*a*, lower surface 11*b*, or side surfaces 11*s* of the housing 11 due to relatively low dimensional accuracy (relatively high dimensional tolerance) of the insertion opening 92, elastically deformed protruding parts 33*a* are interposed in this gap so looseness does not occur.

Next, the operator mates the first counterpart connector 101A and the second counterpart connector 101B with the connector 10 mounted to the wall member 91. Specifically, the mating part 111*b* of the counterpart housing 111 of the first counterpart connector 101A is inserted into the forward insertion recessed part 13*f* in the housing 11 of the connector 10 and the mating part 111*b* of the counterpart housing 111 of the second counterpart connector 101B is inserted into the rearward insertion recessed part 13*r* of the housing 11 of the connector 10. Furthermore, as the mating part 111*b* of the first counterpart connector 101A and the mating part 111*b* of the second counterpart connector 101B are advanced toward the back of the forward insertion recessed part 13*f* and the rearward insertion recessed part 13*r*, the insertion recessed part intermediate plates 18*a* in the forward insertion recessed part 13*f* and in the rearward insertion recessed part 13*r* advance in a relative manner into the board insertion recessed parts 113 of each of the mating parts 111*b* and the tips of the two contact protruding parts 65*a* of the terminals 61 protruding below (Z-axis negative direction) the lower surface of the insertion recessed part intermediate plates 18*a* come into contact with the conductor wires 193 of the FPC 191 mounted in the first counterpart connector 101A and in the second counterpart connector 101B.

Finally, as illustrated in FIGS. 1 to 3, mating of the first counterpart connector 101A and the second counterpart connector 101B with the connector 10 is complete and the flange parts 111*c* of the counterpart housings 111 of the first counterpart connector 101A and the second counterpart connector 101B approach or come into contact with the front surface 11*f* and the rear surface 11*r* of the housing 11. In addition, as illustrated in FIG. 17, the tips of the two contact protruding parts 65*a* of the terminals 61 come into contact and conduct with the conductor wires 193 of the FPC 191 attached to the first counterpart connector 101A and the second counterpart connector 101B so the conductor wires 193 of the FPC 191 attached to the first counterpart connector 101A conduct with the conductor wires 193 of the FPC 191 attached to the second counterpart connector 101B via the terminals 61 of the connector 10.

In this manner, with the present embodiment, the connector 10 includes:

a housing 11, a plurality of elastomers 31 combined with the housing 11, and a plurality of terminals 61 attached to the housing 11, wherein the housing 11 can be inserted into an insertion opening 92 formed in a wall member 91, and the elastomers 31 include ribs 33 containing a front exposed surface 32*f* and a rear exposed surface 32*r* on the front surface 11*f* and the rear surface 11*r* of the housing 11 and an upper exposed surface 32*a*, a lower exposed surface 32*b*, a right side exposed surface 32*s*1, and a left side exposed surface 32*s*2 exposed on the upper surface 11*a*, the lower surface 11*b*, the right side surface 11*s*1, and the left side surface 11*s*2 of the housing 11, configured into at least one pair (only one in the example illustrated in figures) symmetrically positioned on the left and right sides of the housing 11 in the width direction, the ribs 33 extending in the mating direction of the upper exposed surface 32*a*, the lower exposed surface 32*b*, the right side exposed surface 32*s*1, and the left side exposed surface 32*s*2 enabling contact with the inner surface of the insertion opening 92.

Therefore, the connector 10 can be attached to the wall member 91 without looseness and the attached state can be stably and reliably maintained. In addition, this enables reducing the size, simplifying the structure, reducing component count, reducing costs, and improving the reliability of the connector 10.

Furthermore, the side wall surfaces of the housing 11 include the upper surface 11*a*, the lower surface 11*b*, the right side surface 11*s*1, and the left side surface 11*s*2. The right side elastomer 31A that is the elastomer 31 positioned on the first of the left and right sides of the housing 11 in the width direction includes the upper exposed surface 32*a*, the lower exposed surface 32*b*, and the right side exposed surface 32*s*1 exposed on the upper surface 11*a*, the lower surface 11*b*, and the right side surface 11*s*1 of the housing 11. Each of the upper exposed surface 32*a*, lower exposed surface 32*b*, and right side exposed surface 32*s*1 include ribs 33. The left side elastomer 31B that is the elastomer 31 positioned on the second of the left and right sides of the housing 11 in the width direction includes the upper exposed surface 32*a*, the lower exposed surface 32*b*, and the left side exposed surface 32*s*2 exposed on the upper surface 11*a*, the lower surface 11*b*, and the left side surface 11*s*2 of the housing 11. Each of the upper exposed surface 32*a*, lower exposed surface 32*b*, and left side exposed surface 32*s*2 include ribs 33.

Furthermore, there are at least six ribs 33 and each of the ribs 33 includes the protruding part 33*a* with at least a tip that protrudes outside of the side wall surface of the housing 11.

Furthermore, the housing 11 includes locking member 23 and protruding part 24 that can engage with the wall member 91 positioned near the center thereof in the width direction and each elastomer of the pair of elastomers 31 is combined with the housing 11 to the outside of the locking member 23 and the protruding part 24 in the width direction of the housing 11.

Furthermore, the front surface 11*f* and the rear surface 11*r* are positioned on both sides of the housing 11 in the mating direction.

Furthermore, the housing 11 includes contour protruding parts 17 formed along contours of the front exposed surface 32*f*, the rear exposed surface 32*r*, as well as the upper exposed surface 32*a*, the lower exposed surface 32*b*, the right side exposed surface 32*s*1, and the left side exposed surface 32*s*2 of the elastomer 31.

Furthermore, the housing 11 includes the front locked part 21*f* and the rear locked part 21*r* that can lock with the counterpart connector 101 that can be mated with the connector 10.

Furthermore, the connector 10 is a relay connector or a board connector mounted on a board that can mate with a pair of counterpart connectors 101 and connect the pair of counterpart connectors 101 together.

Next, Embodiment 2 will be described below. Note that, for portions having the same structure as that of Embodiment 1, descriptions thereof are omitted by giving the same reference numerals thereto. Moreover, descriptions of the same operations and effects as those of Embodiment 1 will be omitted.

Figure 18:
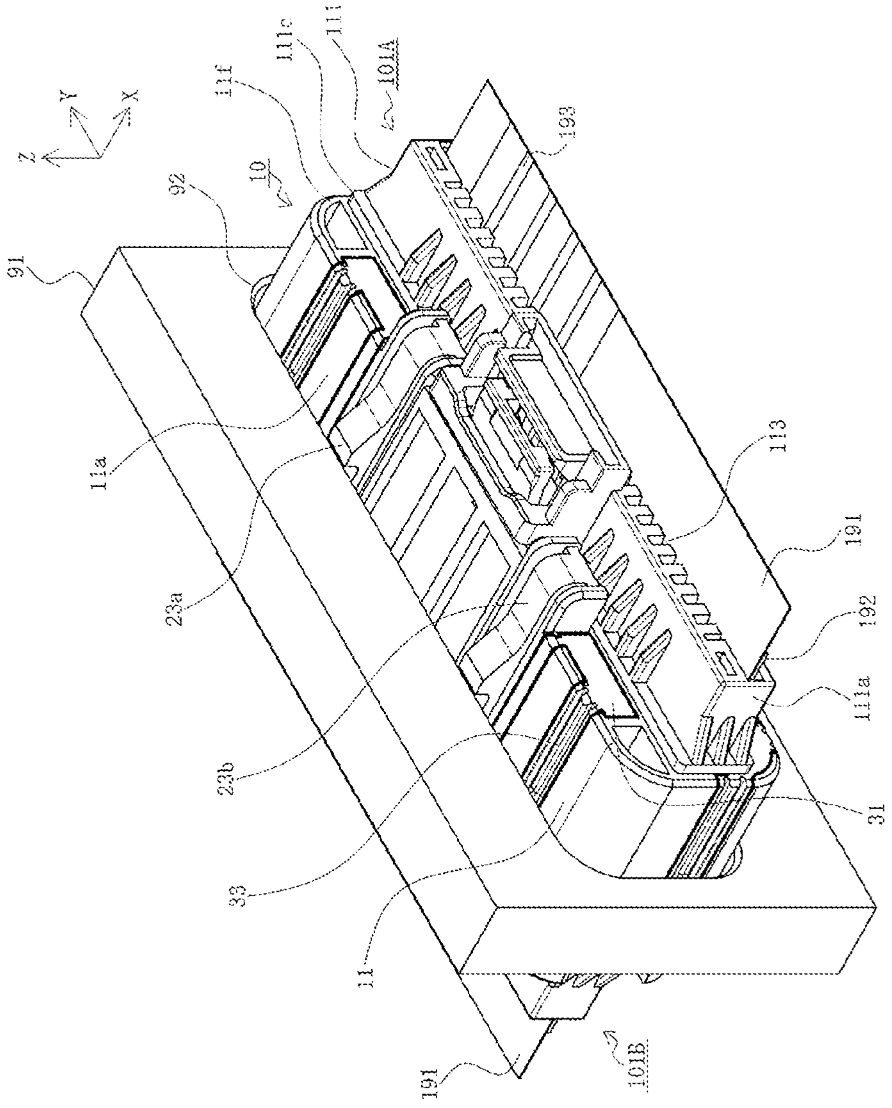
FIG. 18 is a first perspective view illustrating a state in which first and second counterpart connectors are mated to a connector attached to a wall member according to Embodiment 2.
Figure 19:
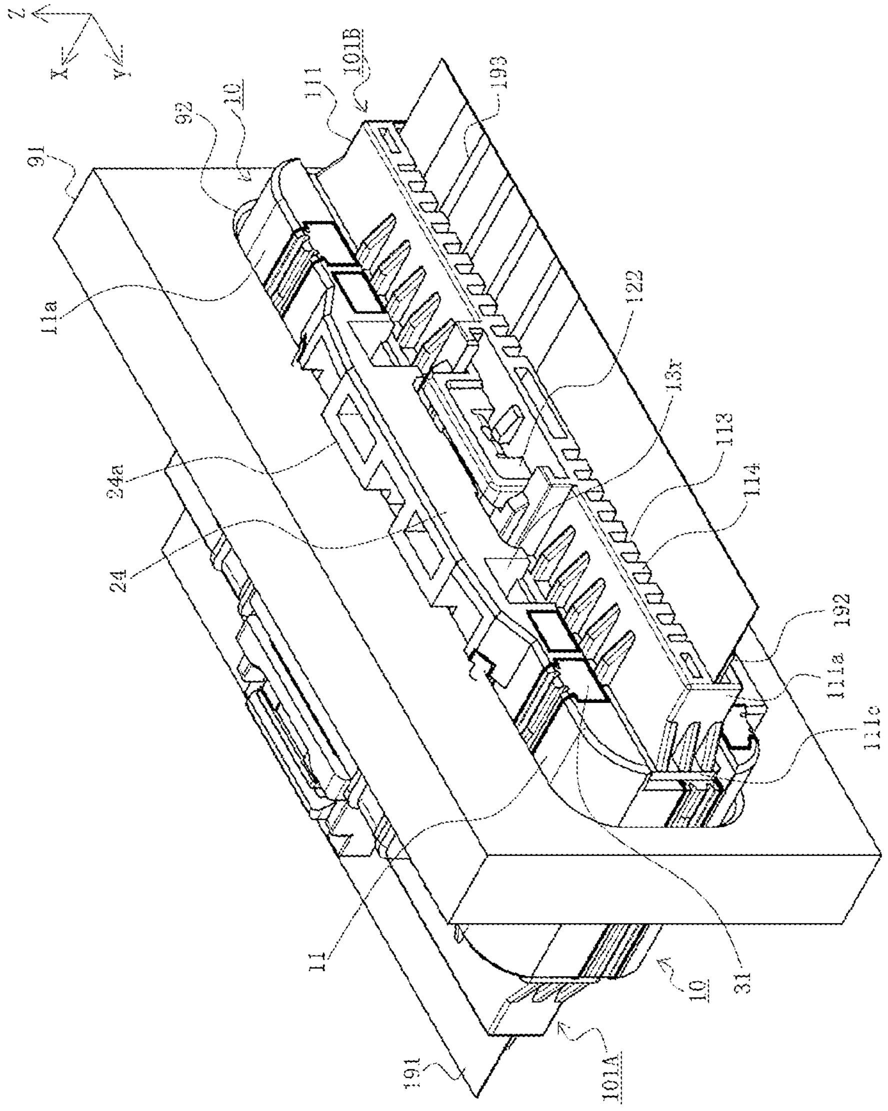
FIG. 19 is a second perspective view illustrating a state in which first and second counterpart connectors are mated to a connector attached to a wall member according to Embodiment 2.
Figure 20:
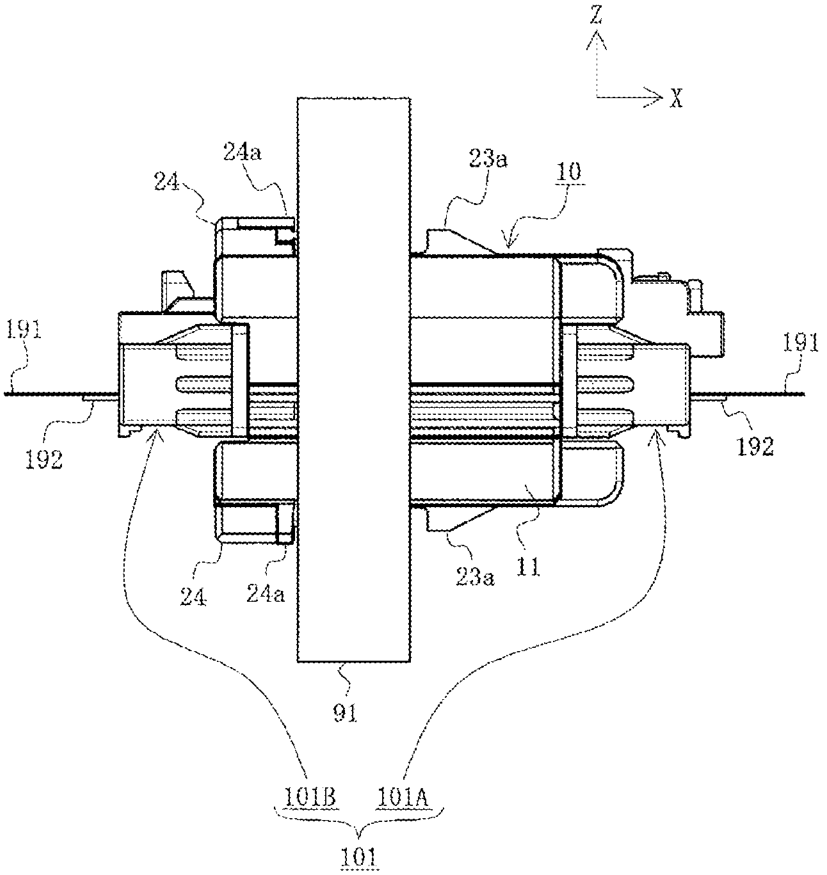
FIG. 20 is a side view illustrating a state in which first and second counterpart connectors are mated to a connector attached to a wall member according to Embodiment 2.
Figure 21:
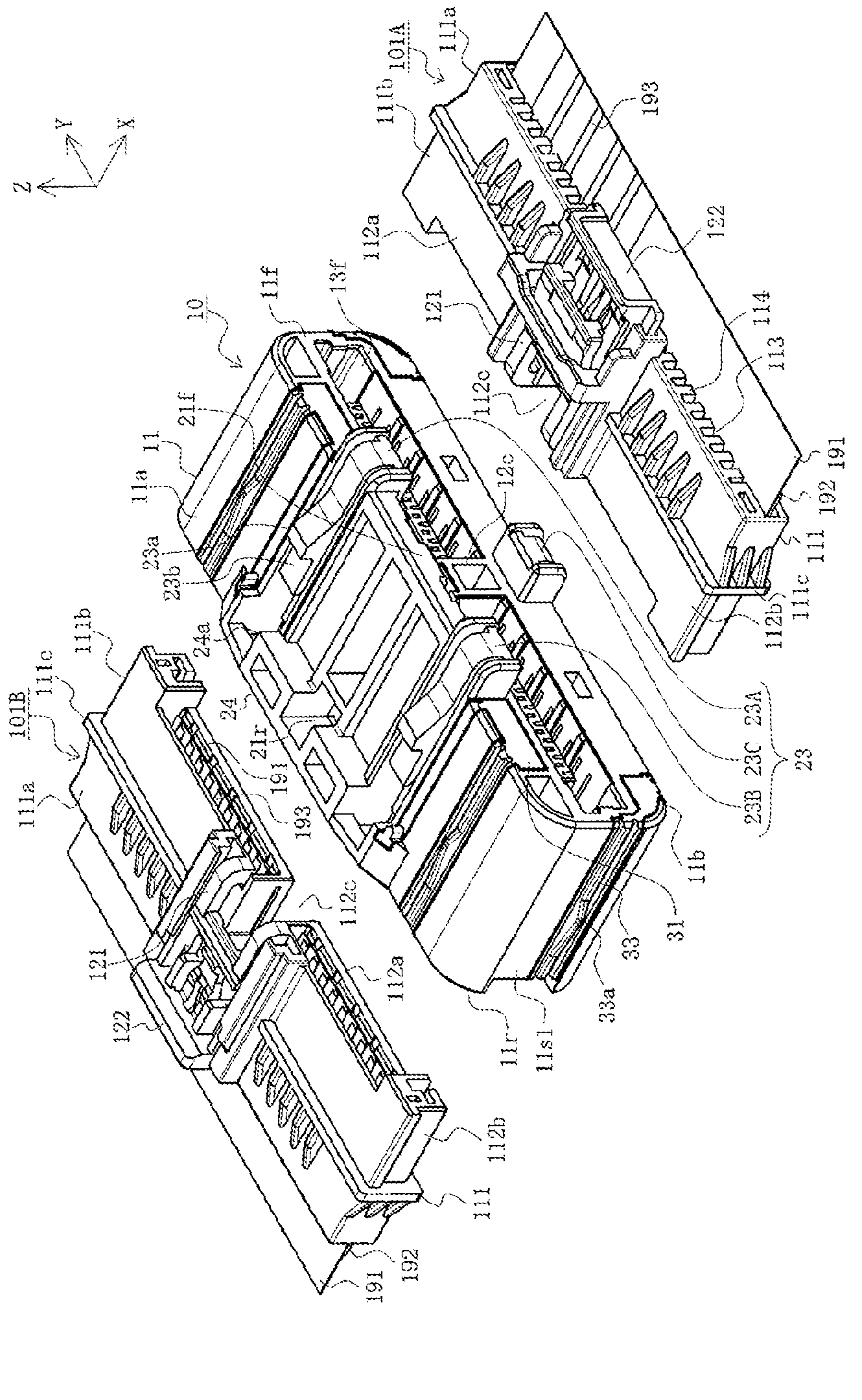
FIG. 21 is a perspective view illustrating a state before mating between the connector and the first and second counterpart connectors according to Embodiment 2.
Figure 22:
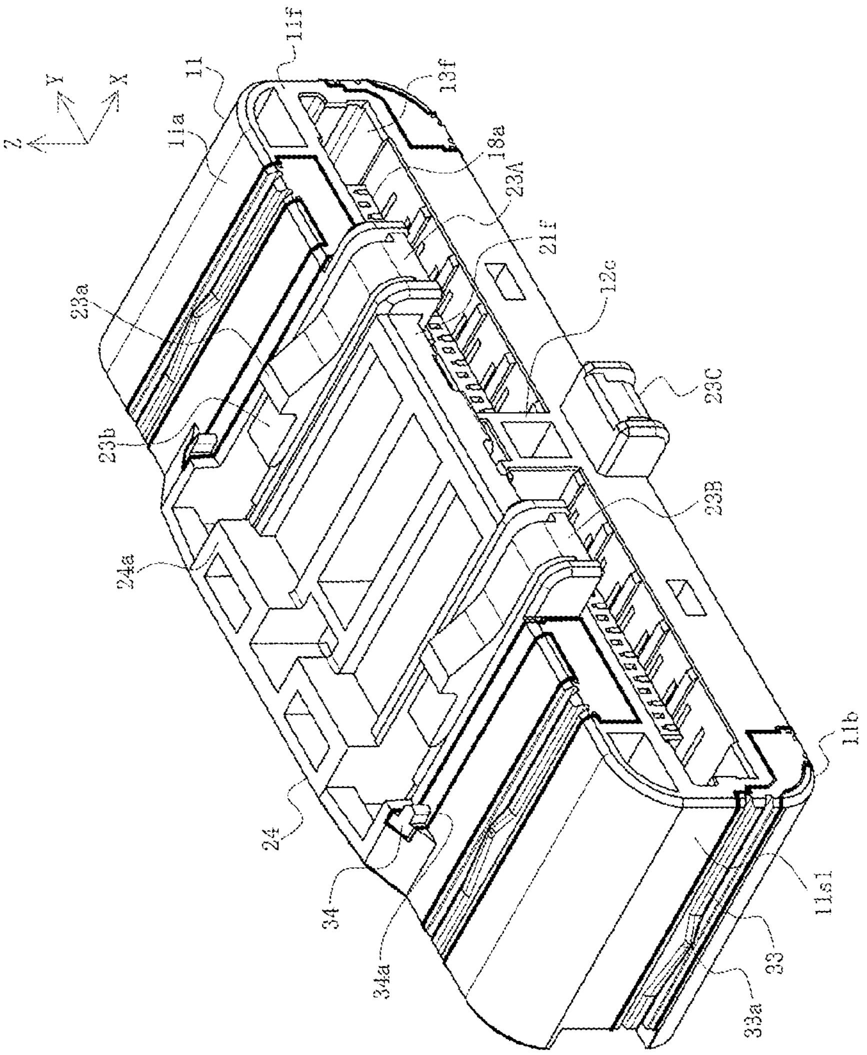
FIG. 22 is a perspective view of the connector in Embodiment 2, viewed obliquely from above and the front.
Figure 23A:
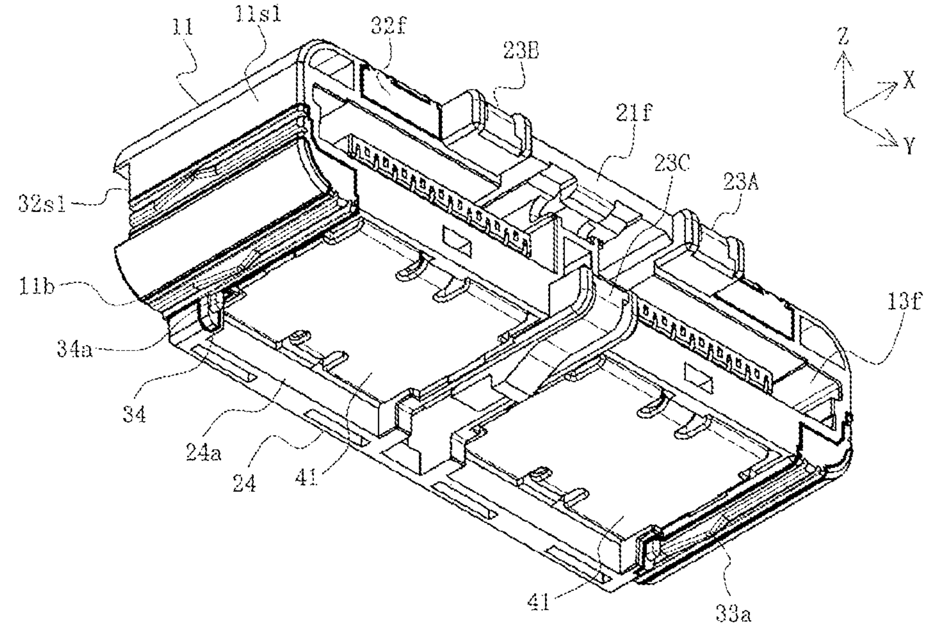
FIGS. 23A and 23B are perspective views of the connector in Embodiment 2 viewed obliquely from below and the front, where
Figure 23B:
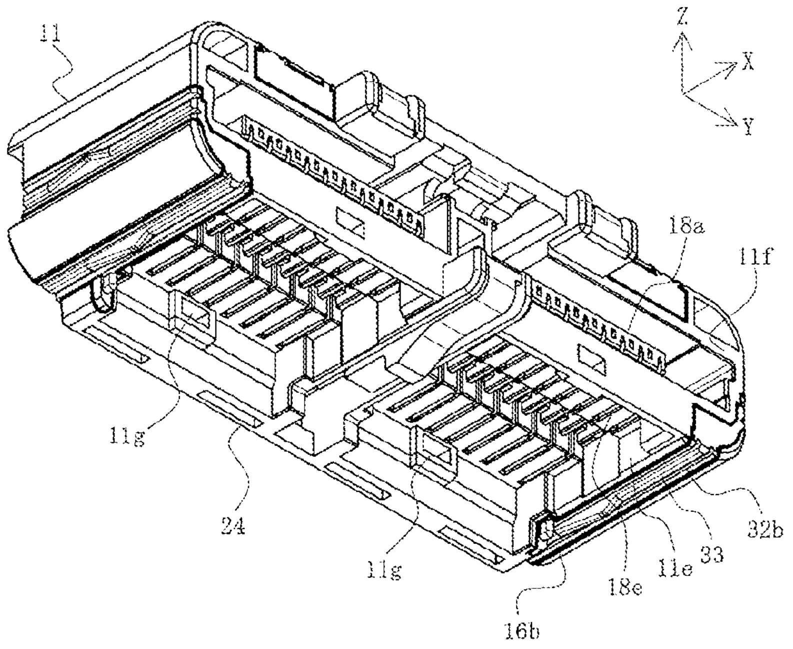
Figure 24:
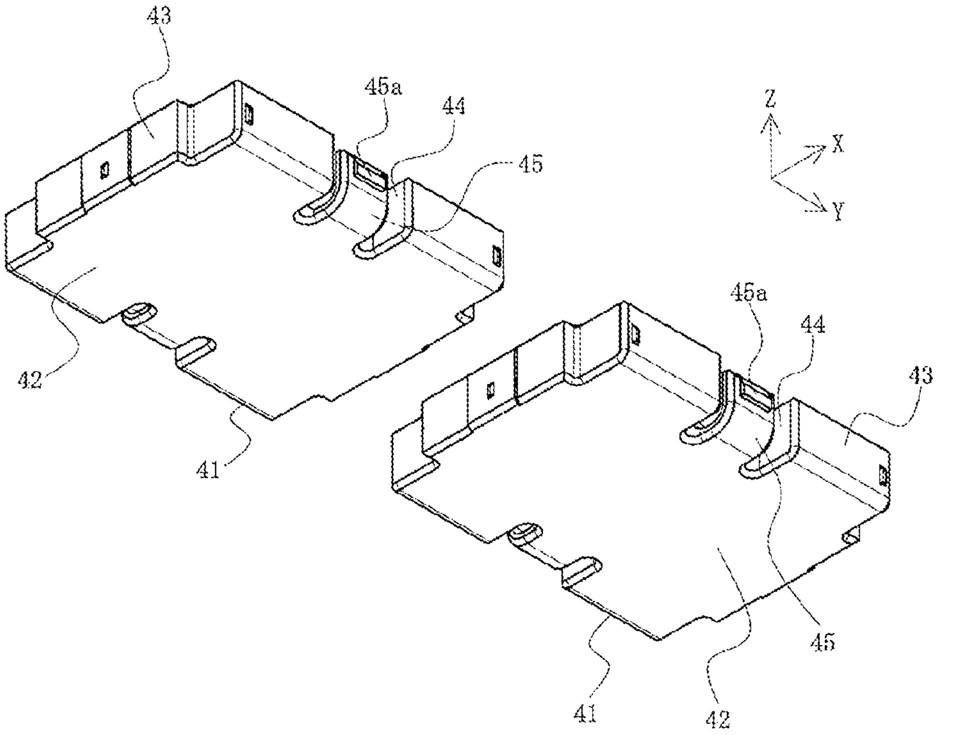
FIG. 24 is a perspective view of the bottom cover member of the connector in Embodiment 2, viewed obliquely from below and the front.
Figure 25:
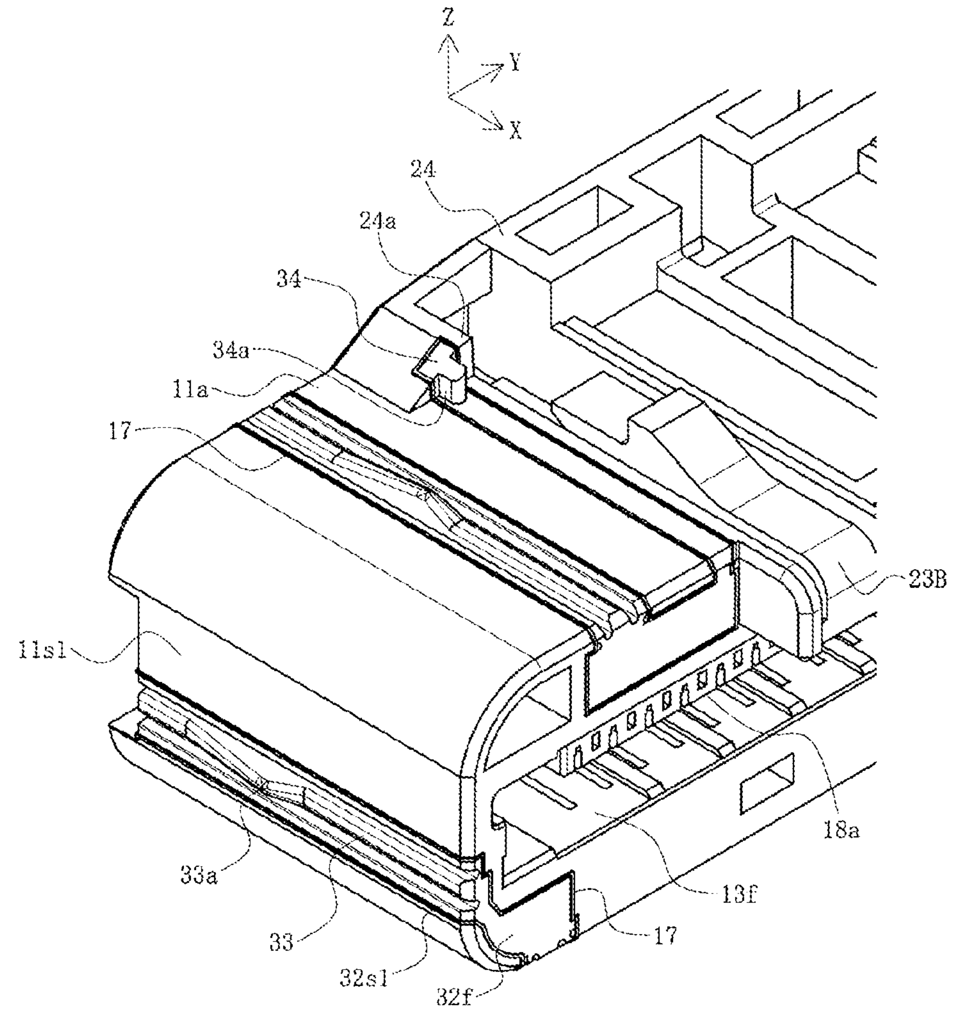
FIG. 25 is an enlarged view of the essential parts in FIG. 22.
Figure 26:
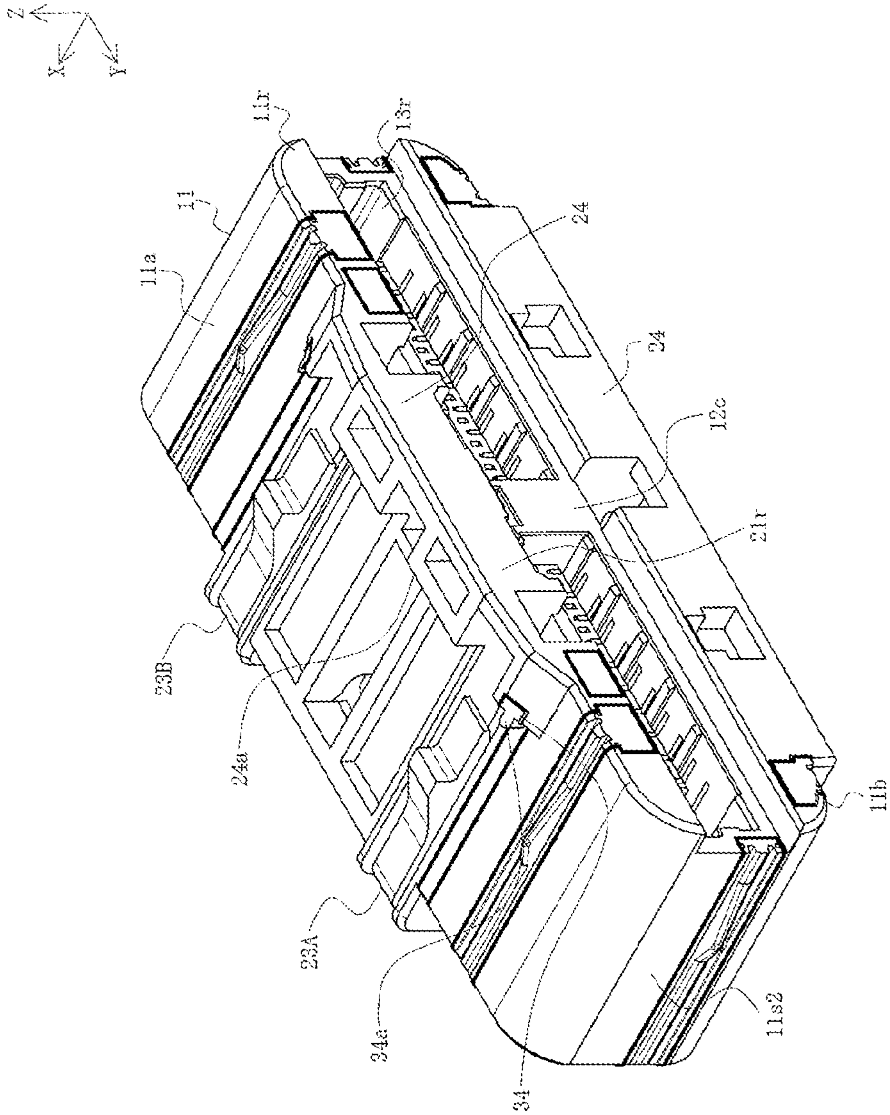
FIG. 26 is a perspective view of the connector in Embodiment 2, viewed obliquely from above and the rear.
Figure 27A:
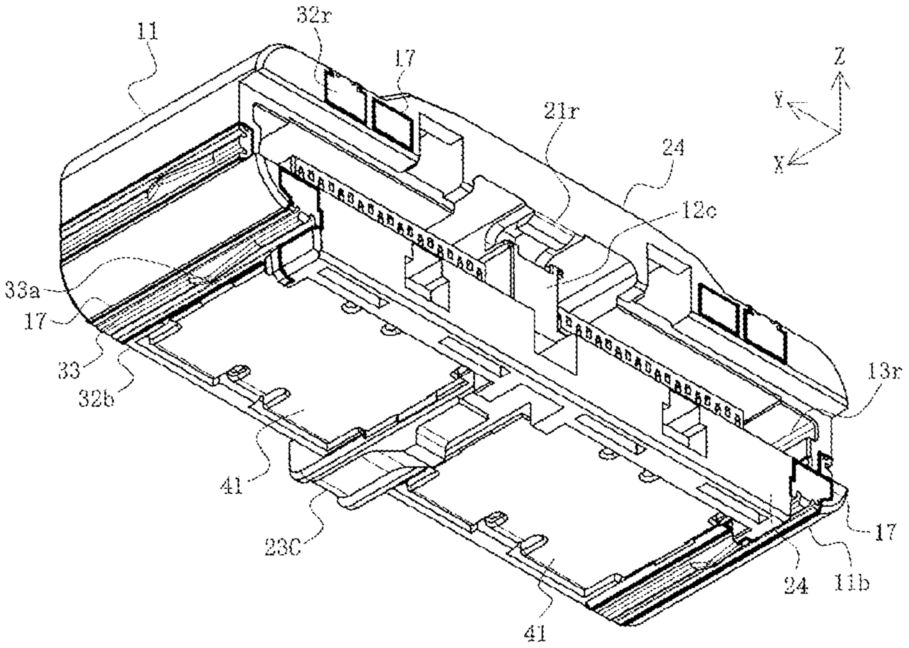
FIGS. 27A and 27B are perspective views of the connector in Embodiment 2 viewed obliquely from below and the rear, where
Figure 27B:
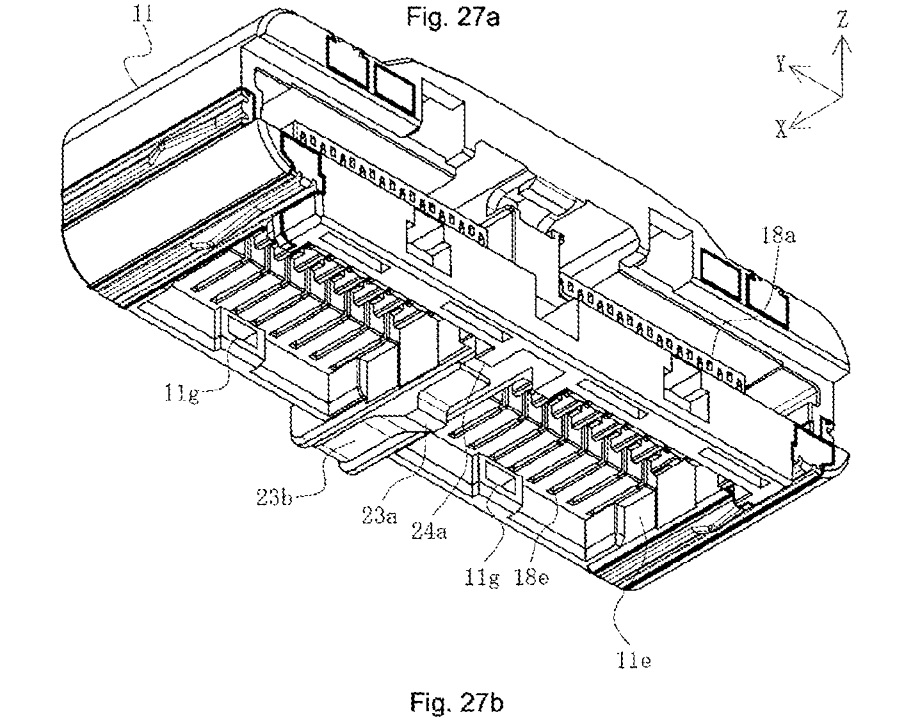
Figure 28:
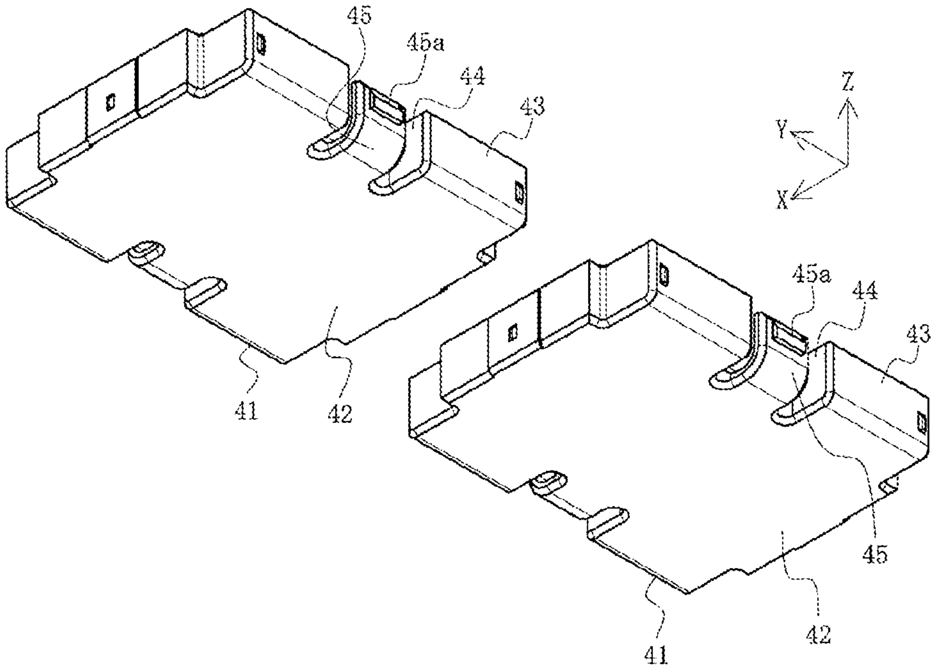
FIG. 28 is a perspective view of the bottom cover member of the connector in Embodiment 2, viewed obliquely from below and the rear.
Figure 29:
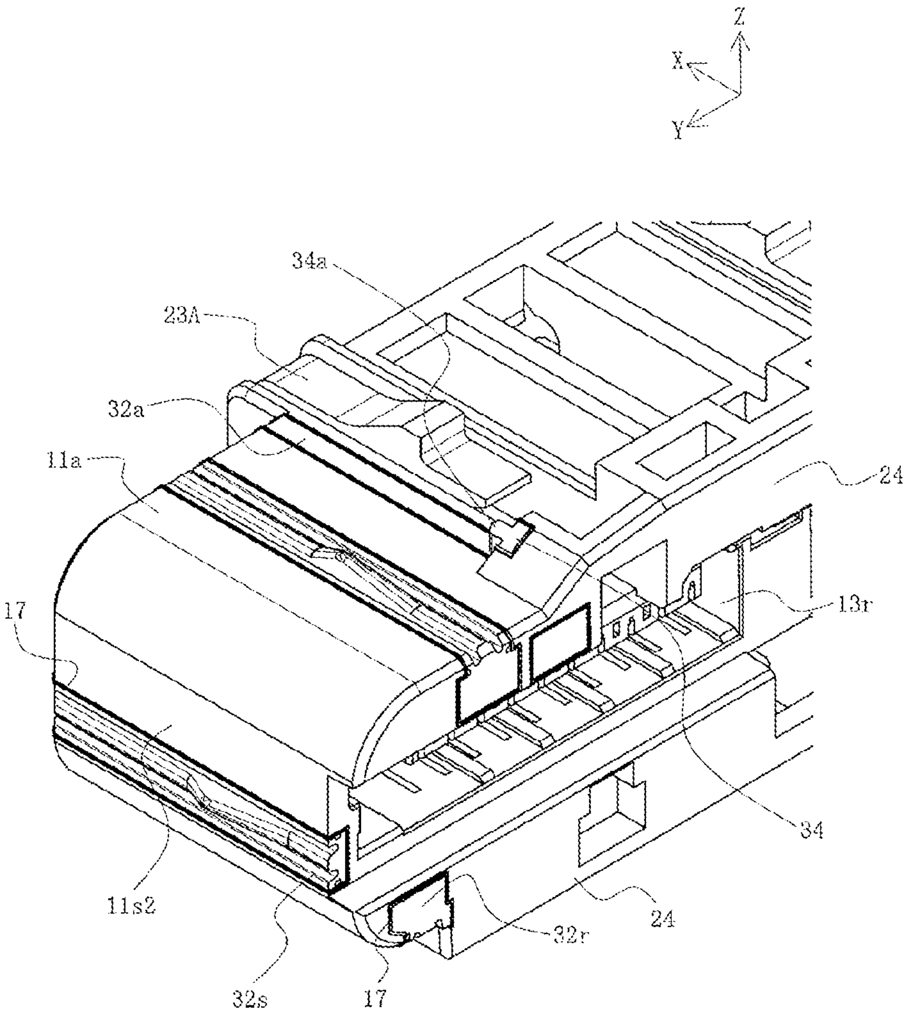
FIG. 29 is an enlarged view of the essential parts in FIG. 26.
Figure 30A:
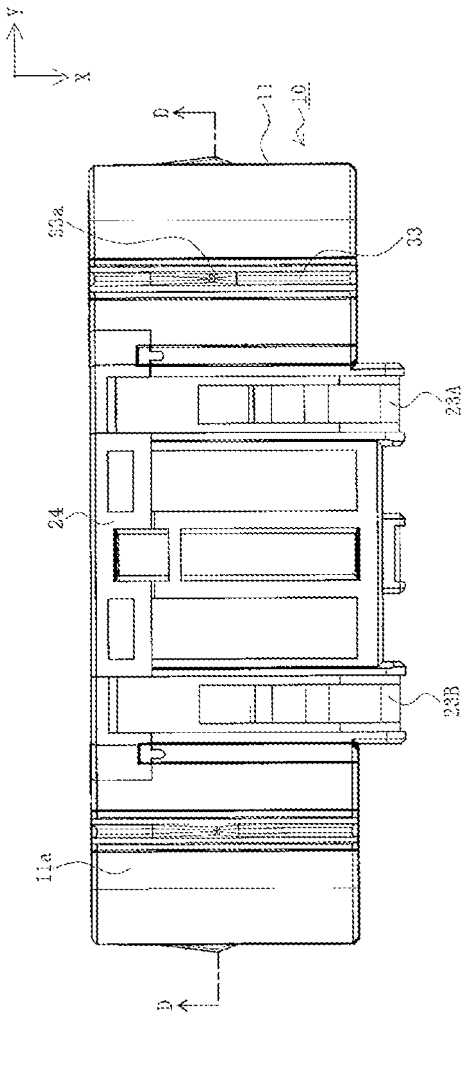
FIGS. 30A and 30B are two-plane views of the connector according to Embodiment 2, where
Figure 30B:
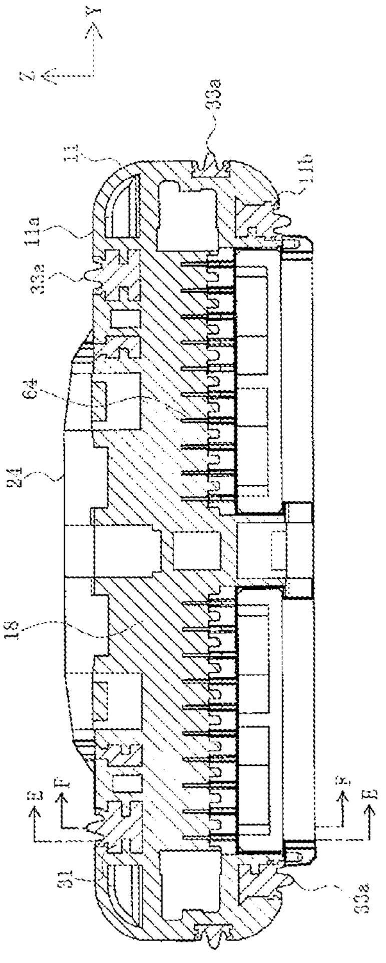
Figure 31:
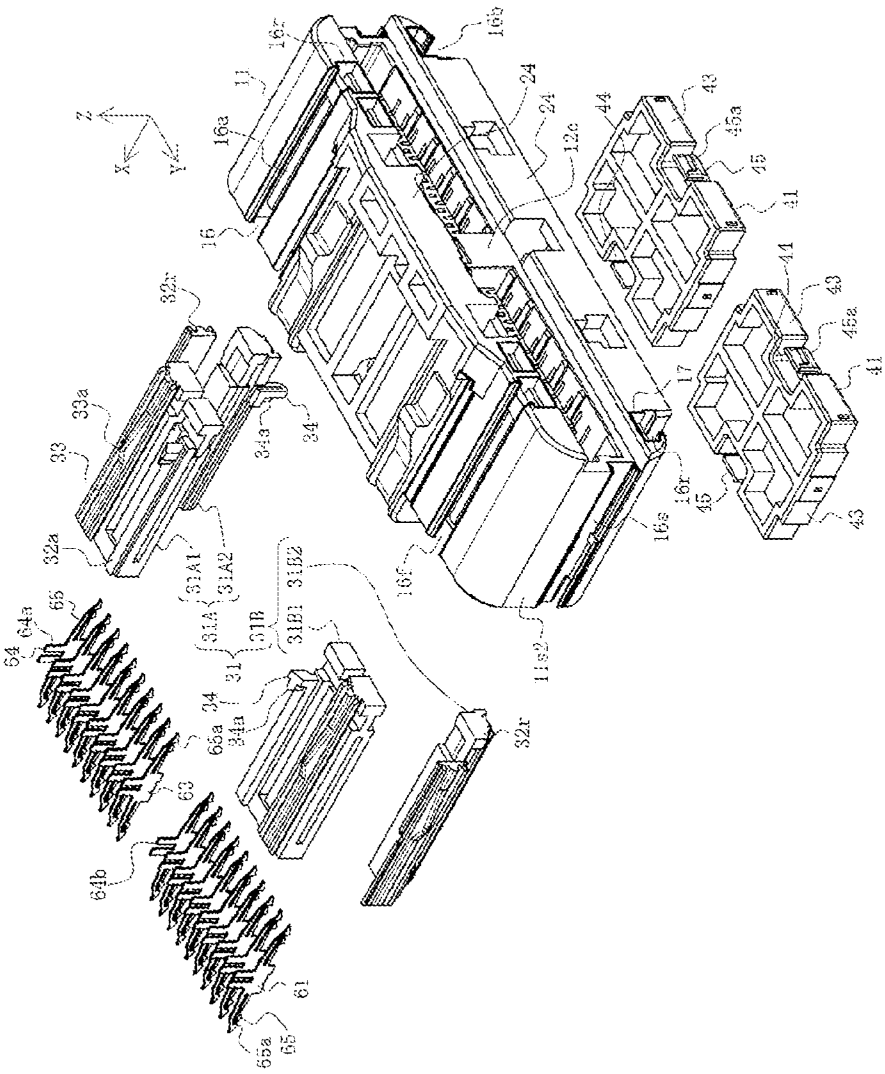
FIG. 31 is an exploded perspective view of the connector in Embodiment 2, viewed obliquely from above and the rear.
Figure 32:
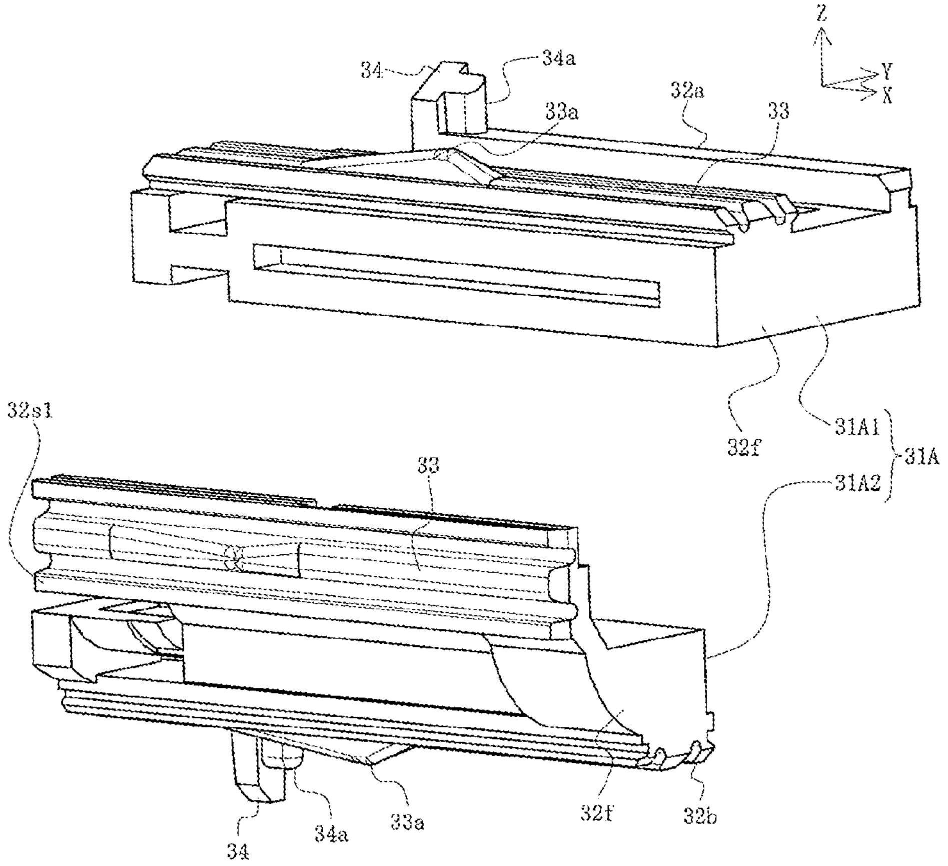
FIG. 32 is a perspective view of the elastomer positioned to the right side of the housing according to Embodiment 2, viewed obliquely from above and the front.
Figure 33:
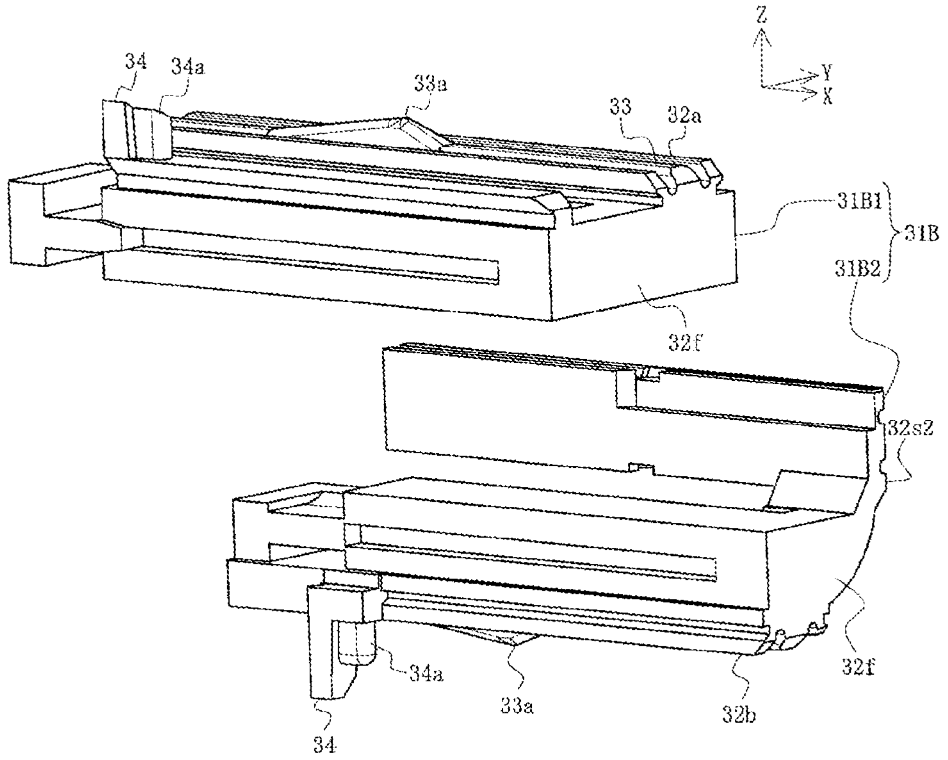
FIG. 33 is a perspective view of the elastomer positioned to the left side of the housing according to Embodiment 2, viewed obliquely from above and the front.
Figure 34:
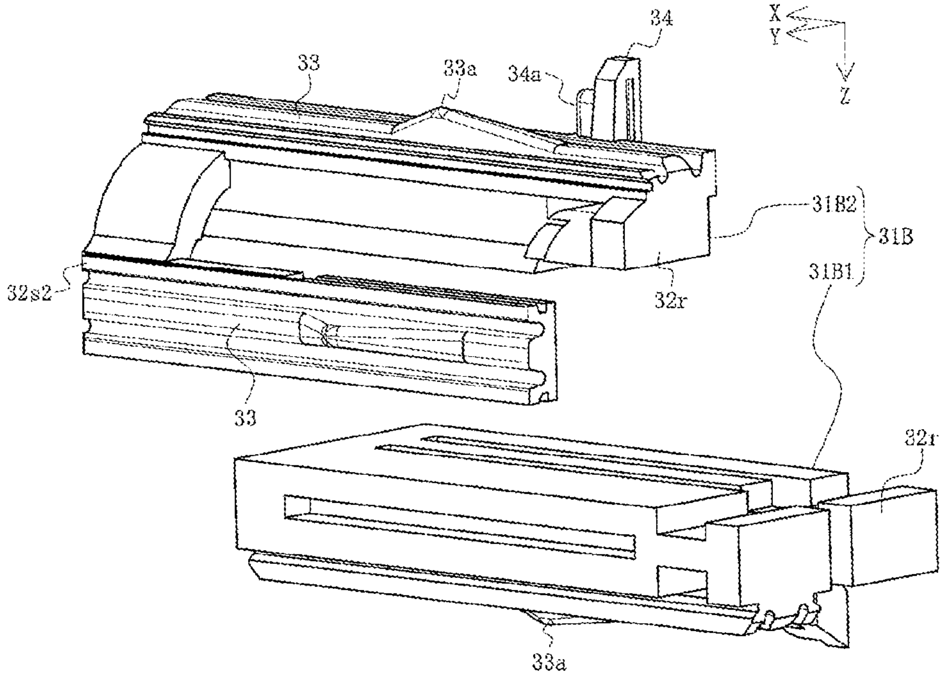
FIG. 34 is a perspective view of the elastomer positioned to the left side of the housing according to Embodiment 2, viewed obliquely from below and the rear.
Figure 35:
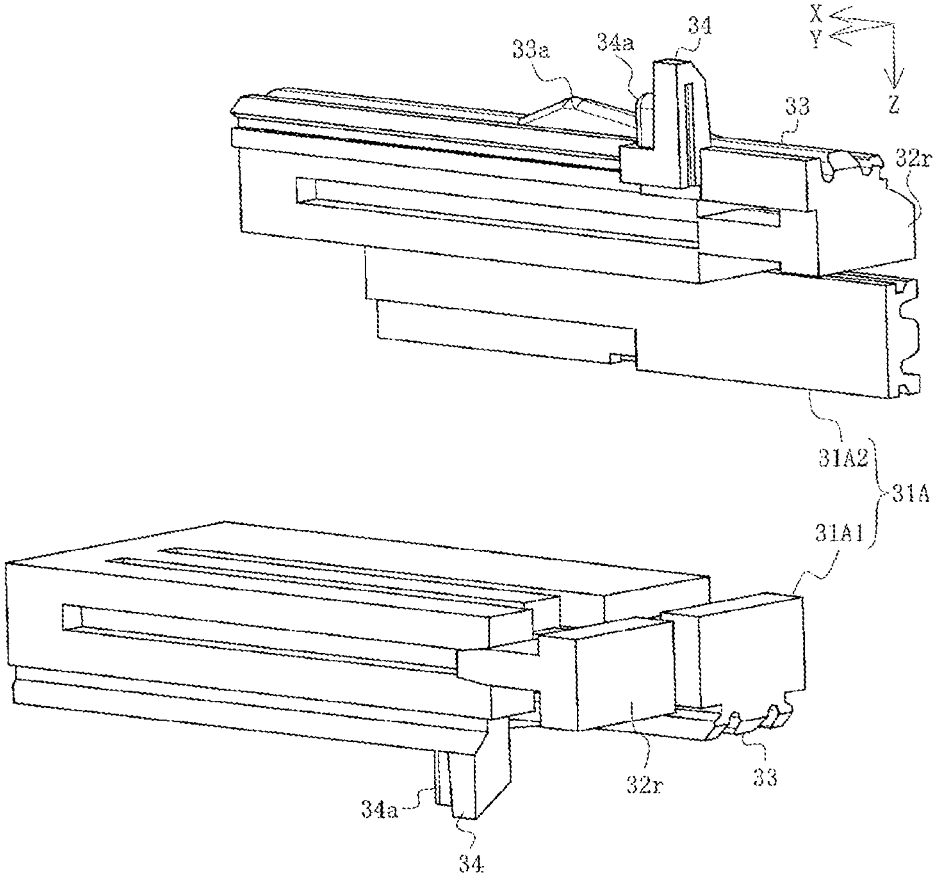
FIG. 35 is a perspective view of the elastomer positioned to the right side of the housing according to Embodiment 2, viewed obliquely from below and the rear.
Figure 36A:
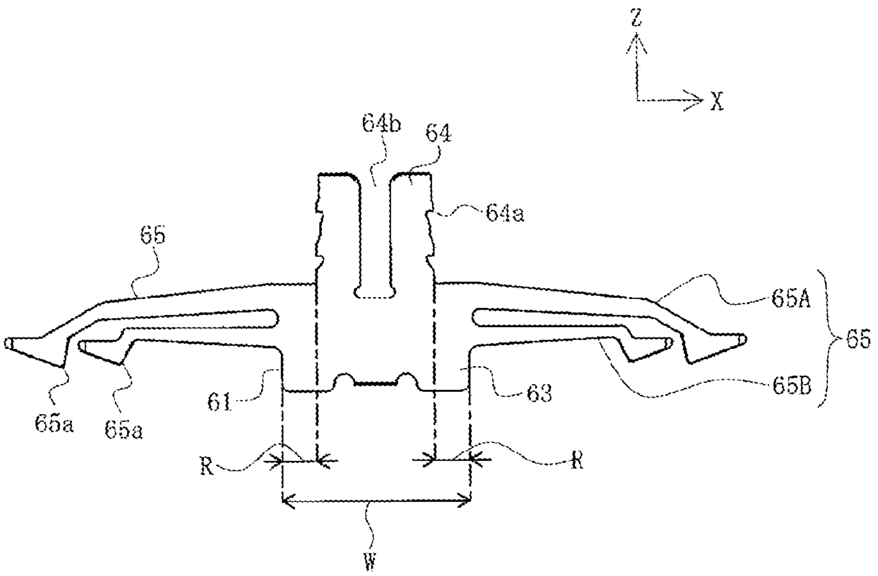
FIGS. 36A and 36B are side views of a terminal according to Embodiment 2, where
Figure 36B:
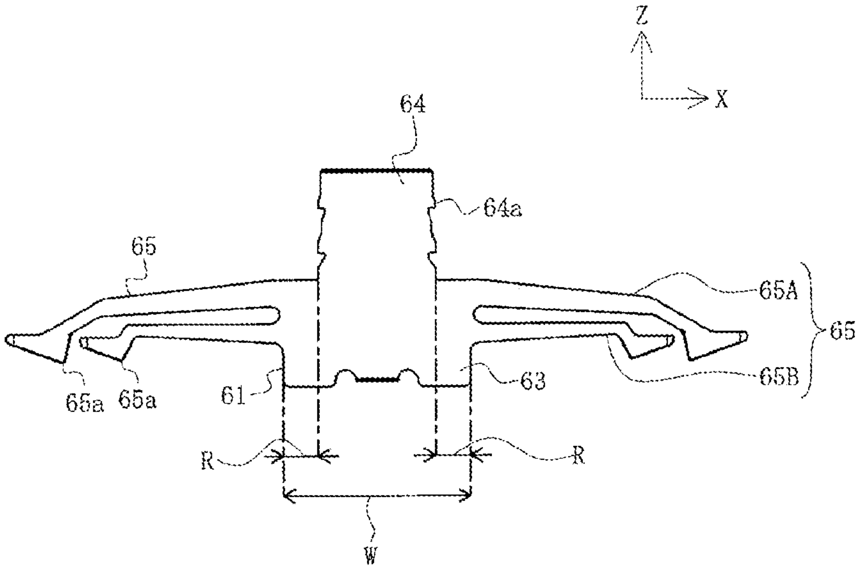
Figure 37A:
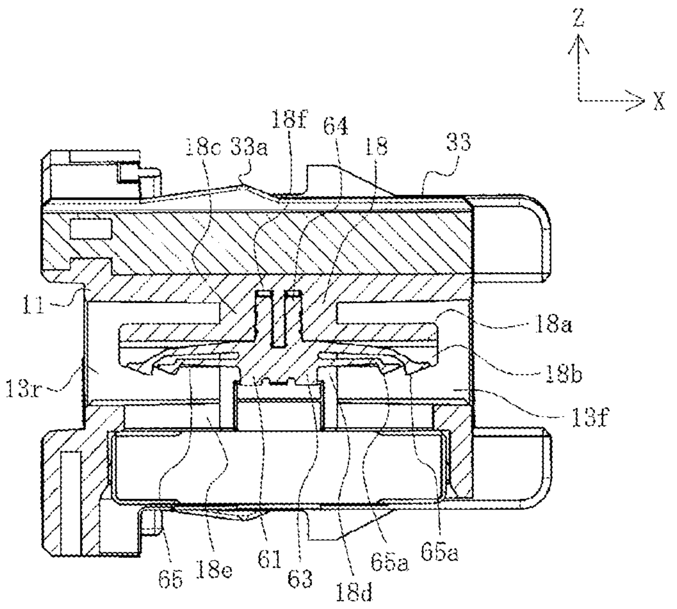
FIGS. 37A and 37B are side cross section views of the connector according to Embodiment 2, where
Figure 37B:
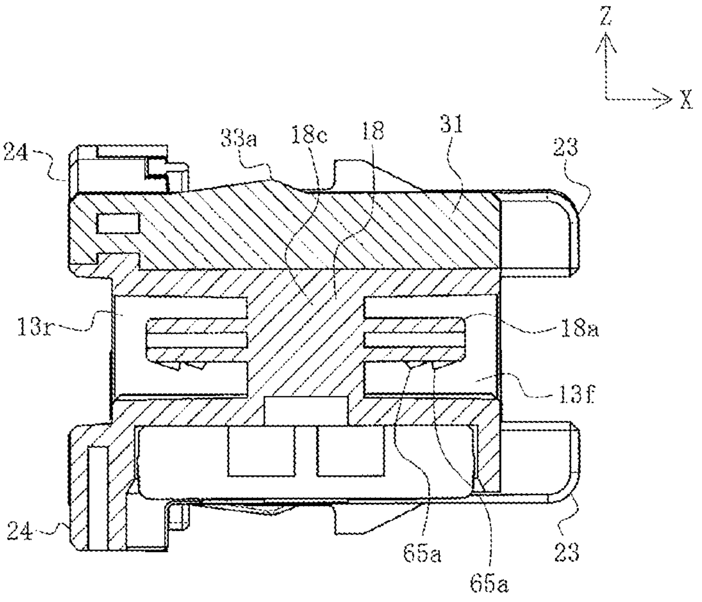
Figure 38:
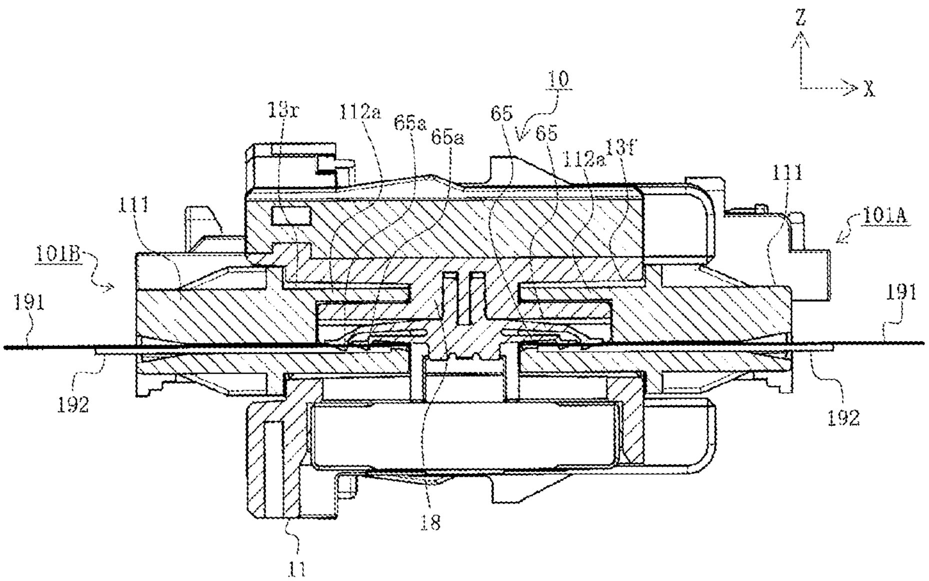
FIG. 38 is a side cross section view illustrating a state in which the first and second counterpart connectors are mated to the connector according to Embodiment 2.
Figure 39:
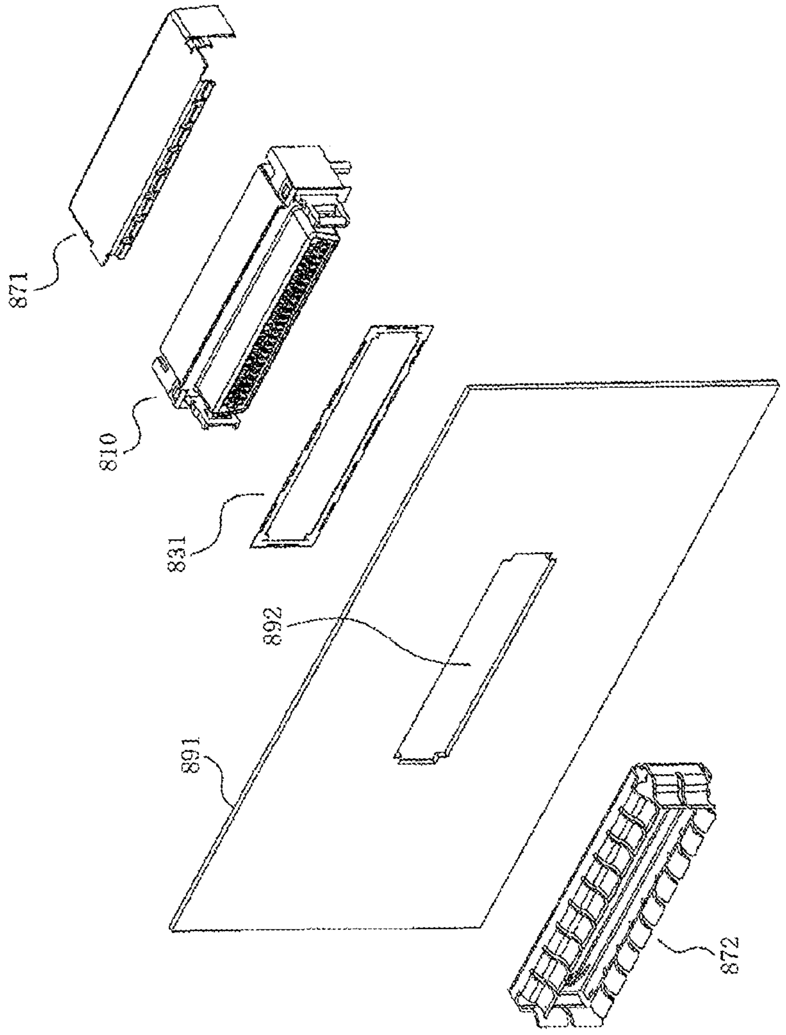
Prior art Fig. 39
FIG. 39 is an exploded perspective view of a connector that penetrates through an opening of a conventional case.

FIG. 18 is a first perspective view illustrating a state in which first and second counterpart connectors are mated to a connector attached to a wall member according to Embodiment 2, FIG. 19 is a second perspective view illustrating a state in which first and second counterpart connectors are mated to a connector attached to a wall member according to Embodiment 2, FIG. 20 is a side view illustrating a state in which first and second counterpart connectors are mated to a connector attached to a wall member according to Embodiment 2, FIG. 21 is a perspective view illustrating a state before mating between the connector and the first and second counterpart connectors according to Embodiment 2, FIG. 22 is a perspective view of the connector in Embodiment 2, viewed obliquely from above and the front, FIGS. 23A and 23B are perspective views of the connector in Embodiment 2, viewed obliquely from below and the front, FIG. 24 is a perspective view of the bottom cover member of the connector in Embodiment 2, viewed obliquely from below and the front, FIG. 25 is an enlarged view of the essential parts in FIG. 22, FIG. 26 is a perspective view of the connector in Embodiment 2, viewed obliquely from above and the rear, FIGS. 27A and 27B are perspective views of the connector in Embodiment 2, viewed obliquely from below and the rear, FIG. 28 is a perspective view of the bottom cover member of the connector in Embodiment 2, viewed obliquely from below and the rear, FIG. 29 is an enlarged view of the essential parts in FIG. 26, FIGS. 30A and 30B are two-plane views of the connector according to Embodiment 2, FIG. 31 is an exploded perspective view of the connector in Embodiment 2, viewed obliquely from above and the rear, FIG. 32 is a perspective view of the elastomer positioned to the right side of the housing according to Embodiment 2, viewed obliquely from above and the front; FIG. 33 is a perspective view of the elastomer positioned to the left side of the housing according to Embodiment 2, viewed obliquely from above and the front, FIG. 34 is a perspective view of the elastomer positioned to the left side of the housing according to Embodiment 2, viewed obliquely from below and the rear, FIG. 35 is a perspective view of the elastomer positioned to the right side of the housing according to Embodiment 2, viewed obliquely from below and the rear, FIGS. 36A and 36B are side views of the first terminal of Embodiment 2, FIGS. 37A and 37B are side cross section views of the connector according to Embodiment 2, and FIG. 38 is a side cross section view illustrating a state in which the first and second counterpart connectors are mated to the connector according to Embodiment 2. Note that in FIGS. 23A and 23B, FIG. 23A is a figure illustrating a state of having a bottom cover member attached and FIG. 23B is a figure illustrating a state with the bottom cover member removed, in FIGS. 27A and 27B, FIG. 27A is a figure illustrating a state of having the bottom cover member attached and FIG. 27B is a figure illustrating a state with the bottom cover member removed, in FIGS. 30A and 30B, FIG. 30A is a top view and FIG. 30B is a cross section view taken along the line D-D in FIG. 30A, in FIGS. 36A and 36B, FIG. 36A is a side view of a preferred example, and FIG. 36B is a side view of a modified example, and in FIGS. 37A and 37B, FIG. 37A is a cross section view taken along the line E-E in FIG. 30B, and FIG. 37B is a cross section view taken along the line F-F in FIG. 30B.

While in Embodiment 1, there is one left and right pair of the elastomers 31, in the present embodiment, there are two left and right pairs of the elastomers 31.

Specifically, as illustrated in FIG. 31, in the present embodiment, there are two pairs, in other words, four elastomers 31 including the right side elastomer 31A and the left side elastomer 31B, and further the right side elastomer 31A includes a right side upper elastomer 31A1 and a right side lower elastomer 31A2, and the left side elastomer 31B includes a left side upper elastomer 31B1 and a left side lower elastomer 31B2. Furthermore, the four elastomers 31, in other words, the right side upper elastomer 31A1, the right side lower elastomer 31A2, the left side upper elastomer 31B1, and the left side lower elastomer 31B2 are mutually separate, independent members.

Furthermore, the right side upper elastomer 31A1 and the left side upper elastomer 31B1 are plane symmetric members with respect to a plane of symmetry that is the X-Z plane (vertical surface) that passes through the center of the housing 11 in the width direction. In addition, the right side lower elastomer 31A2 and the left side lower elastomer 31B2 are plane symmetric members with respect to a plane of symmetry that is the X-Z plane that passes through the center of the housing 11 in the width direction.

Note that the configuration of other points of the elastomers 31 in the present embodiment are the same as that of Embodiment 1 described above, and therefore, a description thereof is omitted.

In addition, in the present embodiment, as illustrated in FIGS. 23A, 23B, 27A, 27B, 31A, 31B, and the like, a bottom cover member 41 covering the lower side of the pair of lower recessed parts 11*e* is formed on the lower surface 11*b* of the housing 11 and attached to the housing 11.

As illustrated in FIGS. 24, 28, 31, and the like, each of the bottom cover members 41 is a substantially square dish shaped member and includes a substantially rectangular flat plate shaped bottom plate 42, four side walls 43 rising from the edges of this bottom plate 42, recessed parts 44 formed in the side walls 43 positioned at the front (X-axis positive direction) and at the rear (X-axis negative direction) of the bottom cover members 41, and engaging pieces 45 arranged in the recessed parts 44. The engaging pieces 45 have a base end that is parallel with the bottom plate 42 and the free ends thereof are plate shaped elastic members bent so as to face upward (Z-axis positive direction) and engaging protrusions 45*a* that protrude outward are formed near the free ends as engaging parts.

In addition, engaging recessed parts 11$g$ are formed on the inner walls positioned to the front (X-axis positive direction) and to the rear (X-axis negative direction) of each of the lower recessed parts 11$e$ as engaging parts that can engage with the engaging protrusions 45$a$.

Furthermore, attaching of the terminals 61 to the housing 11 is completed by passing each of the terminals 61 through each of the terminal insertion slits 18$e$ opened in the ceiling of the lower recessed parts 11$e$ from below the housing 11 and performing insertion into the corresponding terminal stowing recessed parts 18$d$, anchor stowing parts 18$f$, and contact part stowing grooves 18$b$. Thereafter, the bottom cover members 41 can be attached to the housing 11 to cover the bottom of the lower recessed parts 11$e$. In this case, each of the engaging protrusions 45$a$ of the bottom cover members 41 engage with the corresponding engaging recessed parts 11$g$ so the bottom cover members 41 are reliably attached to the housing 11 and do not detach.

In this manner, the lower recessed parts 11$e$ of the housing 11 are covered by the bottom cover members 41 so advancing into the lower recessed parts 11$e$ of a member such as fingers of the operator, a tool, or the like when the connector 10 and the counterpart connector 101 are mated, which would damage the terminals 61 or the like, is prevented. In addition, entering of dust or the like foreign material that may be present in the surrounding environment into the lower recessed parts 11$e$ and adhering to the terminals 61 or the like is prevented.

Note that the configuration of other points of the connector 10 and the counterpart connector 101 in the present embodiment along with other operations for mating the connector 10 and the counterpart connector 101 are the same as in Embodiment 1 so the description thereof is omitted.

Moreover, the disclosure herein describes features relating to suitable typical embodiments. Various other Embodiments, modifications, and variations within the scope and spirit of the claims appended hereto will naturally be conceived of by those skilled in the art upon review of the disclosure herein.

The present disclosure can be applied to a connector.

The invention claimed is:

1. A connector, comprising:

a housing;

a plurality of elastic members combined with the housing; and a plurality of terminals mounted in the housing, wherein the housing can be inserted into an opening formed in a wall member, the elastic members include a mating exposed surface exposed on a mating surface of the housing and a side wall exposed surface exposed on a side wall surface of the housing and constitute at least one left and right symmetric pair positioned respectively on both left and right sides in a width direction of the housing, and the side wall exposed surface includes a rib extending in the mating direction that is able to come into contact with an inner surface of the opening.

2. The connector according to claim 1, wherein the side wall surfaces of the housing include a first side wall surface, a second side wall surface, a third side wall surface, and a fourth side wall surface, the elastic member positioned on a first of a left or right side of the housing in the width direction includes a first side wall exposed surface, a second side wall exposed surface, and a third side wall exposed surface exposed on the first side wall surface, the second side wall surface, and the third side wall surface of the housing and each of the first side wall exposed surface, the second side wall exposed surface, and the third side wall exposed surface include the ribs, and the elastic member positioned on a second of the left or right side of the housing in the width direction includes a first side wall exposed surface, a second side wall exposed surface, and a fourth side wall exposed surface exposed on the first side wall surface, the second side wall surface, and the fourth side wall surface of the housing and each of the first side wall exposed surface, the second side wall exposed surface, and the fourth side wall exposed surface include ribs.

3. The connector according to claim 2, wherein there are at least six ribs and the ribs respectively include at least a tip that protrudes outside of the side wall surface of the housing.

4. The connector according to claim 1, wherein there are two pairs of the elastic members.

5. The connector according to claim 1, wherein the housing includes a locking part positioned toward the center thereof in the width direction and each of the elastic members are combined with the housing more to an outside in the width direction of the housing than the locking part.

6. The connector according to claim 5, wherein the locking part includes a locking member and a protruding part that can engage with the wall member.

7. The connector according to claim 1, wherein the mating surfaces are positioned on both sides of the housing in the mating direction.

8. The connector according to claim 1, wherein the housing includes a contour protruding part formed along a contour of the mating exposed surface and the side wall exposed surface of the elastic members.

9. The connector according to claim 1, wherein the housing includes a locking part that can lock with a counterpart connector that can mate with the connector.

10. The connector according to claim 1, wherein the connector is a relay connector or a board connector mounted on a board for mating with a pair of counterpart connectors and connects the pair of counterpart connectors together.

* * * * *